US010362520B2

(12) United States Patent
Yousefi'zadeh et al.

(10) Patent No.: US 10,362,520 B2
(45) Date of Patent: Jul. 23, 2019

(54) CONGESTION REDUCTION OF LTE NETWORKS

(71) Applicant: The Regents of the University of California, Oakland, CA (US)

(72) Inventors: Homayoun Yousefi'zadeh, Irvine, CA (US); Amr Albanna, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 82 days.

(21) Appl. No.: 15/593,109

(22) Filed: May 11, 2017

(65) Prior Publication Data
US 2017/0359752 A1 Dec. 14, 2017

Related U.S. Application Data

(63) Continuation-in-part of application No. 15/488,330, filed on Apr. 14, 2017.

(60) Provisional application No. 62/348,098, filed on Jun. 9, 2016.

(51) Int. Cl.
*H04W 36/22* (2009.01)
*H04W 28/08* (2009.01)
*H04W 36/00* (2009.01)

(52) U.S. Cl.
CPC .......... *H04W 36/22* (2013.01); *H04W 28/08* (2013.01); *H04W 36/00837* (2018.08)

(58) Field of Classification Search
CPC .................................................. H04W 36/22
See application file for complete search history.

(56) References Cited

U.S. PATENT DOCUMENTS 6,141,565 A 10/2000 Feuerstein et al.
6,490,452 B1 12/2002 Boscovic et al.
7,197,311 B2 3/2007 Matusz
(Continued)

OTHER PUBLICATIONS

Mishra, Sumita et al., "Load Balancing Optimization in LTE/LTE-A Cellular Networks: A Review", Dec. 2014, Amity school of Engineering and Technology (Year: 2014).*
(Continued)

*Primary Examiner* — Jason E Mattis
(74) *Attorney, Agent, or Firm* — Nguyen Tarbet

(57) ABSTRACT

Optimal reduction of 4G LTE cellular network congestion utilizes two components of learning and optimization. First, an MLPDL learning approach is used to model cellular network congestion measured in terms of PRB utilization and predict 80% utilization as breakpoint thresholds of cellular towers as a function of average connected user equipments. Then, an optimization problem is formulated to minimize LTE network congestion subject to constraints of user quality and load preservation. Two alternative solutions, namely Block Coordinated Descent Simulated Annealing (BCDSA) and Genetic Algorithms (GA) are presented to solve the problem. Performance measurements demonstrate that GA offers higher success rates in finding the optimal solution while BCDSA has much improved runtimes with reasonable success rates. Accordingly, integrated iterative methods, programs, and systems are described aiming at minimizing the congestion of 4G LTE cellular networks by redistributing traffic from congested cellular towers to non-congested cellular towers.

60 Claims, 14 Drawing Sheets

(56) References Cited

U.S. PATENT DOCUMENTS

| | | | |
|---|---|---|---|
| 7,272,400 | B1 | 9/2007 | Othmer |
| 8,085,709 | B2 | 12/2011 | Franceschini et al. |
| 8,259,659 | B2 | 9/2012 | Luft et al. |
| 8,301,156 | B2 | 10/2012 | del Rio-Romero et al. |
| 8,488,507 | B2 | 7/2013 | Luft et al. |
| 8,495,207 | B2 | 7/2013 | Lee |
| 8,755,405 | B2 | 6/2014 | Kovvali et al. |
| 8,964,549 | B2 | 2/2015 | Vos et al. |
| 8,989,050 | B2 * | 3/2015 | Cavalcante ....... H04W 72/0426 370/254 |
| 9,001,682 | B2 | 4/2015 | Kovvali et al. |
| 9,148,744 | B2 | 9/2015 | Velusamy et al. |
| 9,357,428 | B2 | 5/2016 | Chow |
| 9,578,547 | B2 | 2/2017 | Elefant et al. |
| 9,578,607 | B2 | 2/2017 | Nobukiyo |
| 2004/0029592 | A1 | 2/2004 | Shyy et al. |
| 2004/0180659 | A1 | 9/2004 | Pedraza et al. |
| 2006/0142021 | A1 | 6/2006 | Mueckenheim et al. |
| 2009/0280853 | A1 * | 11/2009 | Brisebois ............ H04W 52/143 455/522 |
| 2010/0144363 | A1 * | 6/2010 | De Rosa ........... H04W 72/0486 455/452.1 |
| 2012/0202504 | A1 * | 8/2012 | Wegmann ............. H04W 16/08 455/438 |
| 2013/0324076 | A1 * | 12/2013 | Harrang ................ H04W 28/08 455/405 |
| 2014/0057627 | A1 * | 2/2014 | Hejazi ................... H04W 28/08 455/424 |
| 2014/0148175 | A1 | 5/2014 | Luo |
| 2014/0204794 | A1 * | 7/2014 | El-Najjar .............. H04W 16/18 370/254 |
| 2015/0087325 | A1 | 3/2015 | Nuss et al. |
| 2015/0146646 | A1 * | 5/2015 | Chen ................... H04W 52/346 370/329 |
| 2016/0050587 | A1 | 2/2016 | Lam et al. |
| 2017/0208526 | A1 * | 7/2017 | Madan ................. H04W 36/32 |
| 2017/0238211 | A1 * | 8/2017 | El-Najjar .............. H04W 28/08 370/232 |
| 2018/0041921 | A1 * | 2/2018 | Kojima ................ H04W 28/08 |

OTHER PUBLICATIONS

Sharma et al., "Automated W-CDMA Mircrocellular Deployment and Coverage Reconfiguration based on Situation Awareness", May 2002, Centre for Communications Research, University of Bristol (Year: 2002).*

U. Turke and M. Koonert, "Advanced site configuration techniques for automatic umts radio network design," in Vehicular Technology Conference, 2005. VTC 2005-Spring. 2005 IEEE 61st, vol. 3, May 2005, pp. 1960-1964 vol. 3.

I. Siomina, P. Varbrand, and D. Yuan, "Automated optimization of service coverage and base station antenna configuration in umts networks," Wireless Communications, IEEE, vol. 13, No. 6, pp. 16-25, Dec. 2006.

H. Yousefi'zadeh, A. Habibi, X. Li, H. Jafarkhani, and C. Bauer, "A statistical study of loss-delay tradeoff for red queues," Communications, IEEE Transactions on, vol. 60, No. 7, pp. 1966-1974, Jul. 2012.

Y. T. Lee and A. Sidford, "Efficient accelerated coordinate descent methods and faster algorithms for solving linear systems," in Foundations of Computer Science (FOCS), 2013 IEEE 54th Annual Symposium on, Oct. 2013, pp. 147-156.

M. Garcia-Lozano, S. Ruiz, and J. Olmos, "Umts optimum cell load balancing for inhomogeneous traffic patterns," in Vehicular Technology Conference, 2004. VTC2004-Fall. 2004 IEEE 60th, vol. 2, Sep. 2004, pp. 909-913 vol. 2.

S. Mcloone, M. Brown, G. Irwin, and G. Lightbody, "A hybrid linear/nonlinear training algorithm for feedforward neural networks," Neural Networks, IEEE Transactions on, vol. 9, No. 4, pp. 669-684, Jul. 1998.

S. Mcloone, V. Asirvadam, and G. Irwin, "A memory optimal bfgs neural network training algorithm," in Neural Networks, 2002. IJCNN '02. Proceedings of the 2002 International Joint Conference on, vol. 1, 2002, pp. 513-518.

M. Wu and L. Chen, "Image recognition based on deep learning," in Chinese Automation Congress (CAC), 2015, Nov. 2015, pp. 542-546.

P. Kuang, W.-N. Cao, and Q. Wu, "Preview on structures and algorithms of deep learning," in Wavelet Active Media Technology and Information Processing (ICCWAMTIP), 2014 11th International Computer Conference on, Dec. 2014, pp. 176-179.

H. Yousefi'zadeh and E. Jonckheere, "Dynamic neural-based buffer management for queuing systems with self-similar characteristics," Neural Networks, IEEE Transactions on, vol. 16, No. 5, pp. 1163-1173, Sep. 2005.

X. Bin Li and X.-L. Yu, "Influence of sample size on prediction of animal phenotype value using back-propagation artificial neural network with variable hidden neurons," in Computational Intelligence and Software Engineering, 2009. CiSE 2009. International Conference on, Dec. 2009, pp. 1-4.

V. Garg and R. Bansal, "Comparison of neural network back propagation algorithms for early detection of sleep disorders," in Computer Engineering and Applications (ICACEA), 2015 International Conference on Advances in, Mar. 2015, pp. 71-75.

M. Apostolopoulou, D. Sotiropoulos, I. Livieris, and P. Pintelas, "A memoryless bfgs neural network training algorithm," in Industrial Informatics, 2009. INDIN 2009. 7th IEEE International Conference on, Jun. 2009, pp. 216-221.

S. Fahlman, An Empirical Study of Learning Speed in Back—Propagation Networks. Technical Report CMU-CS-88-162, Carnegie Mellon University, 1988.

A. F. C. Hurtado. (Oct. 2005) Umts capacity simulation study, master of science in telematics thesis.

I. Necoara, "A random coordinate descent method for large-scale resource allocation problems," in Decision and Control (CDC), 2012 IEEE 51st Annual Conference on, Dec. 2012, pp. 4474-4479.

B. Wah, Y. Chen, and A. Wan, "Constrained global optimization by constraint partitioning and simulated annealing," in Tools with Artificial Intelligence, 2006. ICTAI '06. 18th IEEE International Conference on, Nov. 2006, pp. 265-274.

Y. Cui, K. Xu, J.Wu, Z. Yu, and Y. Zhao, "Multi-constrained routing based on simulated annealing," in Communications, 2003. ICC '03. IEEE International Conference on, vol. 3, May 2003, pp. 1718-1722 vol. 3.

R. Zeineldin, "An improved simulated annealing approach for solving the constrained optimization problems," in Informatics and Systems (INFOS), 2012 8th International Conference on, May 2012, pp. BIO-27-BIO-31.

B. Wah and T. Wang, "Constrained simulated annealing with applications in nonlinear continuous constrained global optimization," in Tools with Artificial Intelligence, 1999. Proceedings. 11th IEEE International Conference on, 1999, pp. 381-388.

H. Singh, A. Isaacs, T. Ray, and W. Smith, "A simulated annealing algorithm for constrained multi-objective optimization," in Evolutionary Computation, 2008. CEC 2008. (IEEE World Congress on Computational Intelligence). IEEE Congress on, Jun. 2008, pp. 1655-1662.

S. Mohammadi, C. Shang, Z. Ouhib, T. Leventouri, and G. Kalantzis, "A computational study on different penalty approaches for constrained optimization in radiation therapy treatment planning with a simulated annealing algorithm," in Software Engineering, Artificial Intelligence, Networking and Parallel/ Distributed Computing (SNPD), 2015 16th IEEE/ACIS International Conference on, Jun. 2015, pp. 1-6.

X. Yao, X. Liu, G. Hu, and F. Qian, "Link delay inference based on simulated annealing constrained optimization method," in Wireless, Mobile and Multimedia Networks, 2006 IET International Conference on, Nov. 2006, pp. 1-4.

Y. Kim and M. Lee, "Scheduling multi-channel and multi-timeslot in time constrained wireless sensor networks via simulated annealing and particle swarm optimization," Communications Magazine, IEEE, vol. 52, No. 1, pp. 122-129, Jan. 2014.

(56) References Cited

OTHER PUBLICATIONS

E.-G. Talbi and T. Muntean, "Hill-climbing, simulated annealing and genetic algorithms: a comparative study and application to the mapping problem," in System Sciences, 1993, Proceeding of the Twenty-Sixth Hawaii International Conference on, vol. ii, Jan. 1993, pp. 565-573 vol. 2.

R. Qi and S. Zhou, "Simulated annealing partitioning: An algorithm for optimizing grouping in cancer data," in Data Mining Workshops (ICDMW), 2013 IEEE 13th International Conference on, Dec. 2013, pp. 281-286.

B. Hajek, "Cooling shcedules for optimal annealing," Operations Research, May 1988.

P. Tseng, "Convergence of a block coordinate descent method for nondifferentiable minimization," Journal of Optimization Theory and Applications, Jun. 2001.

A. Beck and L. Tetruashvili, "On the convergence of block coordinate descent type methods," SIAM Journal on Optimization, Jan. 2013.

Y. B. Ian Goodfellow and A. Courville, Deep Learning, 2016, book in preparation for MIT Press. [Online]. Available: http://goodfeli.github.io/dlbook/ (2014). [Online]. Available: http://www.deeplearningbook.org/version-2015-11-16/contents/ml.html.

I. Siomina and S. Wanstedt, "The impact of qos support on the end user satisfaction in LTE networks with mixed traffic," in 2008 IEEE 19th International Symposium on Personal, Indoor and Mobile Radio Communications, Sep. 2008, pp. 1-5.

M. B. Stefania Sesia, Issam Toufik, LTE—The UMTS Long Term Evolution. John Wiley & Sons, 2011.

S.N. Sivanandam and S.N. Deepa, Introduction to Genetic Algorithms. Springer, 2008.

A. Chiumento, C. Blanch, C. Desset, S. Polling, L. V. Der Perre, and R. Lauwereins, "Multi-objective genetic algorithm downlink resource allocation in LTE: Exploiting the cell-edge vs. cell center trade-off," in 2014 IEEE 21st Symposium on Communications and Vehicular Technology in the Benelux (SCVT), Nov. 2014, pp. 116-120.

\* cited by examiner

| CQI index | Modulation | Code rate × 1024 | Spectral efficiency (bps/Hz) | DL TP per RB (kbps) | Estimated DL SINR idB |
|---|---|---|---|---|---|
| 1 | QPSK | 78 | 0.1523 | 19.1898 | −7.28 |
| 2 | QPSK | 120 | 0.2344 | 29.5344 | −4.78 |
| 3 | QPSK | 193 | 0.3770 | 47.502 | −2.04 |
| 4 | QPSK | 308 | 0.6016 | 75.8016 | 0.66 |
| 5 | QPSK | 449 | 0.8770 | 110.502 | 2.84 |
| 6 | QPSK | 602 | 1.1758 | 148.1508 | 4.73 |
| 7 | 16QAM | 378 | 1.4766 | 186.0516 | 6.38 |
| 8 | 16QAM | 490 | 1.9141 | 241.1766 | 8.78 |
| 9 | 16QAM | 616 | 2.4063 | 303.1938 | 11.49 |
| 10 | 64QAM | 466 | 2.7305 | 344.043 | 13.27 |
| 11 | 64QAM | 567 | 3.3223 | 418.6098 | 16.52 |
| 12 | 64QAM | 666 | 3.9023 | 491.6898 | 19.71 |
| 13 | 64QAM | 772 | 4.5234 | 569.9484 | 23.12 |
| 14 | 64QAM | 873 | 5.1152 | 644.5152 | 26.37 |
| 15 | 64QAM | 948 | 5.5547 | 699.8922 | 28.79 |

FIG. 1: A sample illustration of LTE CQI dependency on modulation, coding rate, spectral efficiency, downlink achievable throughput per PRB, and SINR.

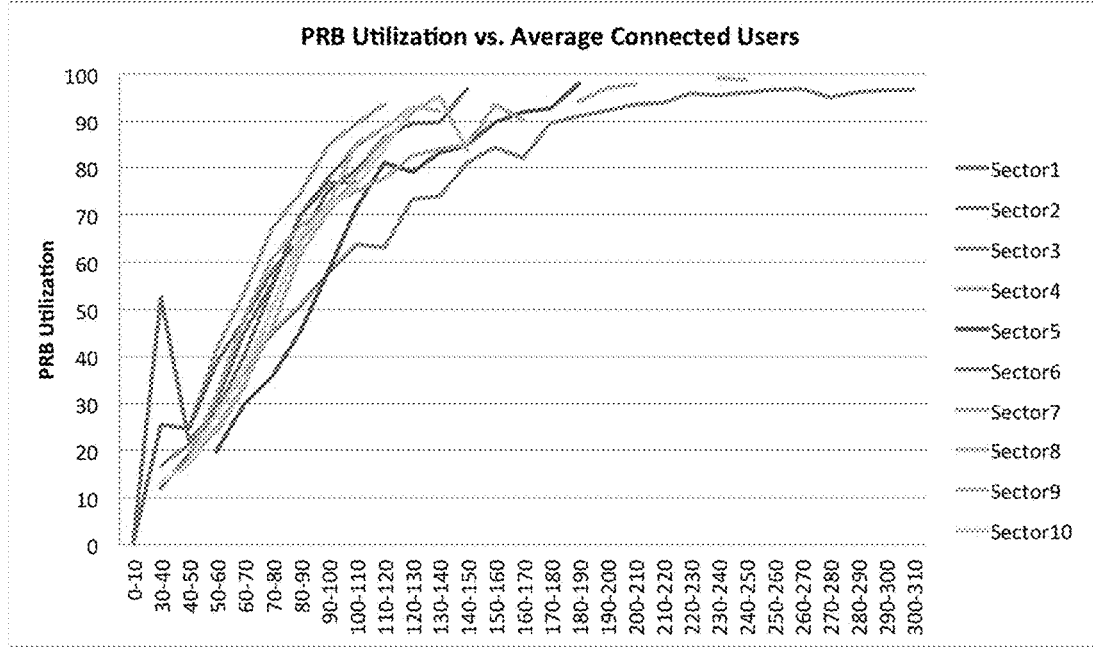

FIG. 2 Actual sample drawings of LTE PRB utilization as a function of average connected UEs.

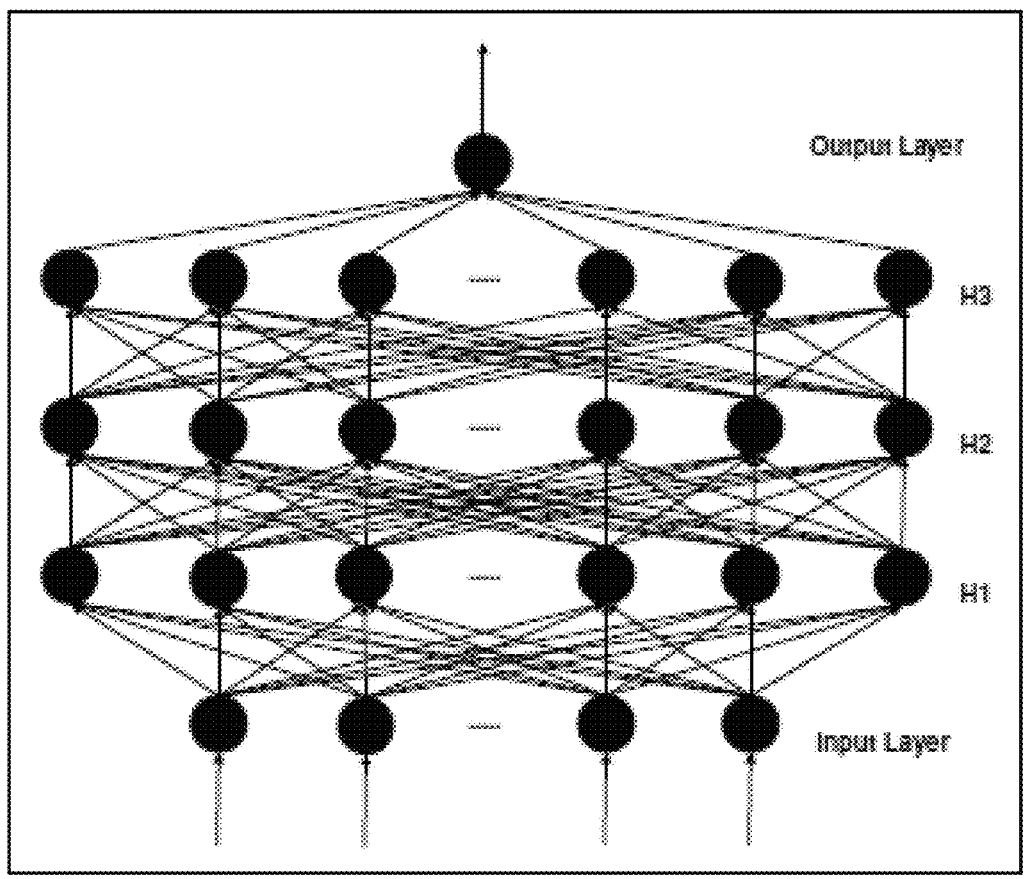
FIG. 3: Multi layer perceptron deep learning structure used for learning breakpoints of individual LTE cellular towers.

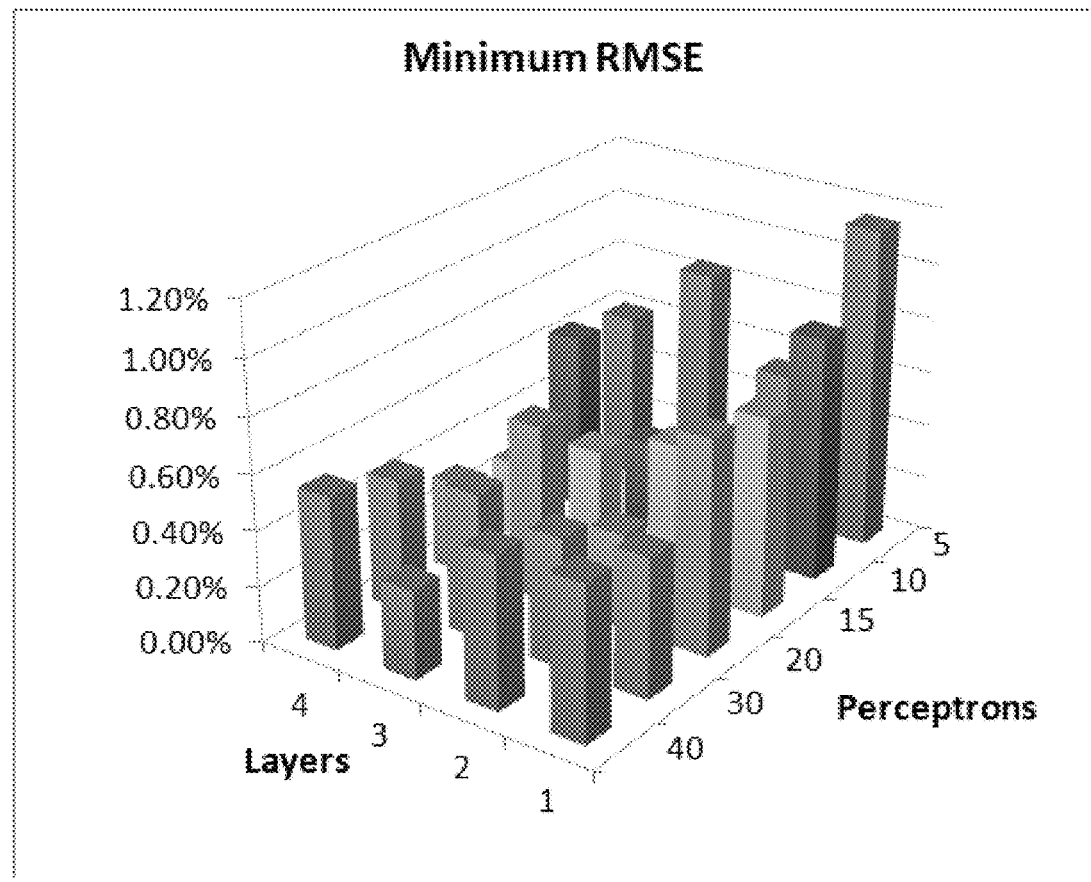
FIG. 4: An illustration of minimum RMSE of MLPD prediction as a function of number of layers and perceptrons.

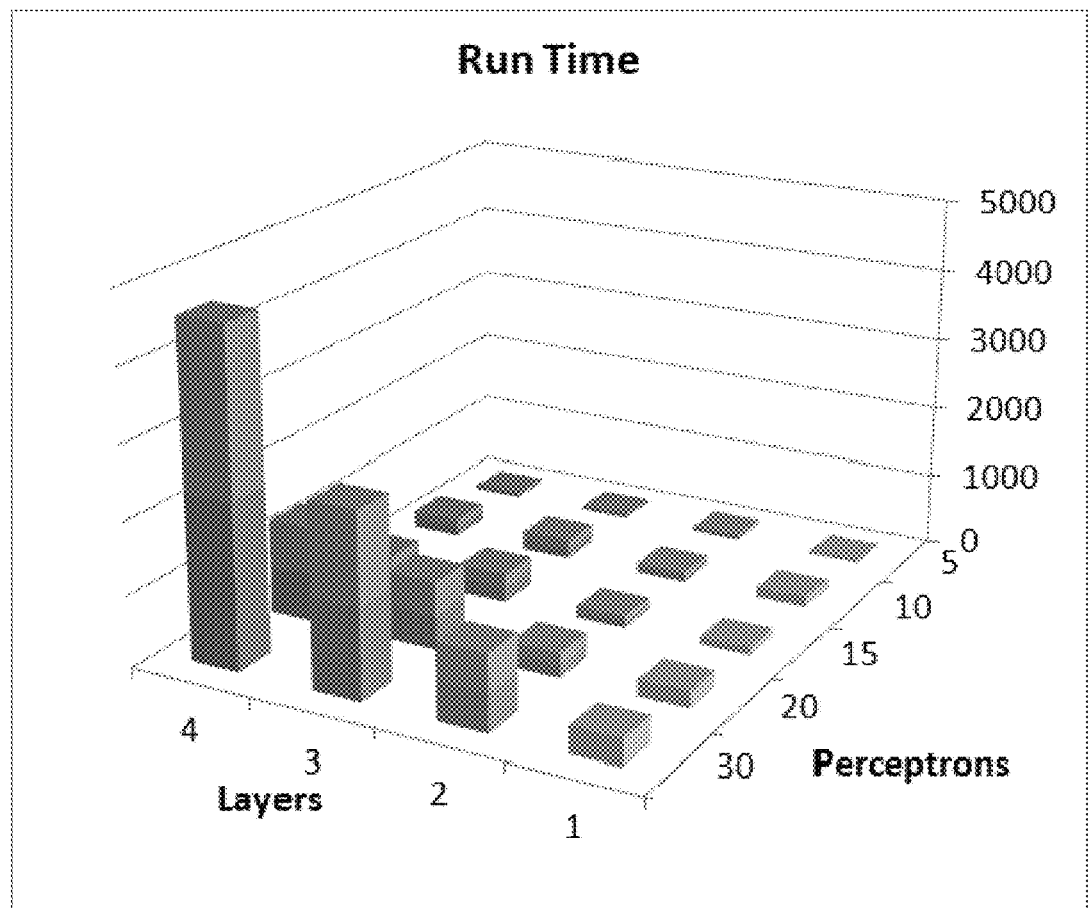
FIG. 5 Measurements of average runtime as a function of number of layers and perceptrons.

| QCI | Resource type | Priority | Packet delay budget | Packet error loss rate | Example services |
|---|---|---|---|---|---|
| 1 | GBR | 2 | 100 ms | $10^{-2}$ | Conversational voice |
| 2 | GBR | 4 | 150 ms | $10^{-3}$ | Conversational video (live streaming) |
| 3 | GBR | 3 | 50 ms | $10^{-3}$ | Real time gaming |
| 4 | GBR | 5 | 300 ms | $10^{-6}$ | Non-conversational video (buffered streaming) |
| 5 | Non-GBR | 1 | 100 ms | $10^{-6}$ | IMS signaling |
| 6 | Non-GBR | 6 | 300 ms | $10^{-6}$ | Video (buffered streaming) TCP-based (e.g., www, e-mail, chat, ftp, p2p file sharing, progressive video, etc.) |
| 7 | Non-GBR | 7 | 100 ms | $10^{-3}$ | Voice, Video (live streaming), Interactive gaming |
| 8 | Non-GBR | 8 | 300ms | $10^{-6}$ | Video (buffered streaming) TCP-based (e.g., www, e-mail, chat, ftp, p2p file sharing, progressive video, etc.) |
| 9 | Non-GBR | 9 | 300ms | $10^{-6}$ | |

FIG. 6: A mapping of QCI classes of service to resource type, priority, delay, and packet error rate in LTE standard.

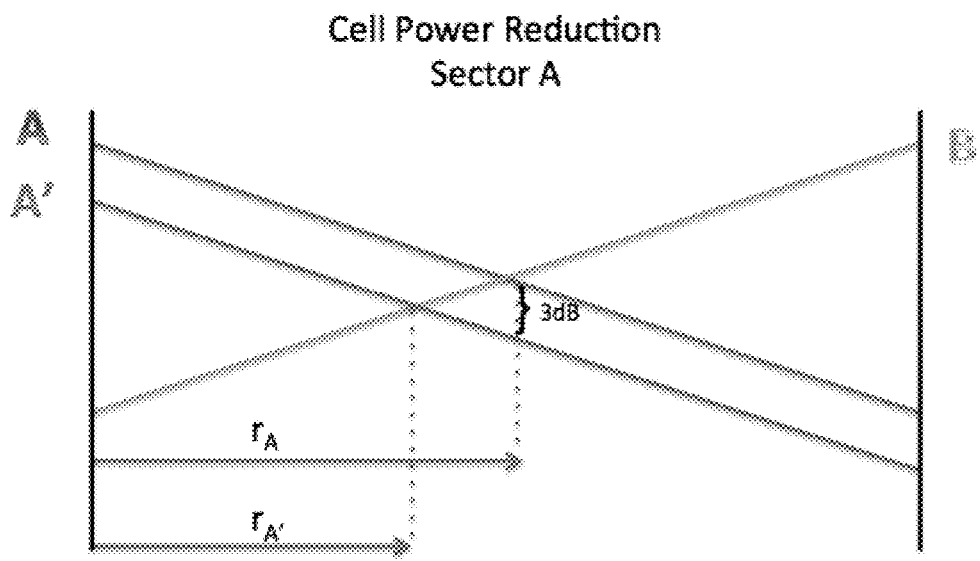

FIG. 7 The impact of changing power $\wp_A$ of cell $A$ on reducing cell $A$ coverage radius.

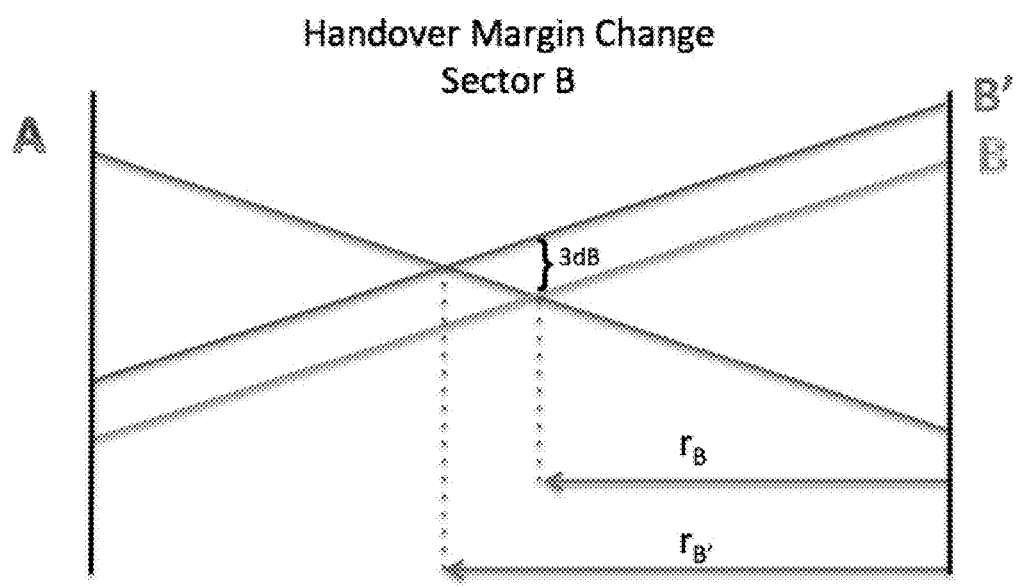
FIG. 8 The impact of changing handover threshold $h_B$ of cell $B$ on reducing cell $A$ coverage radius.

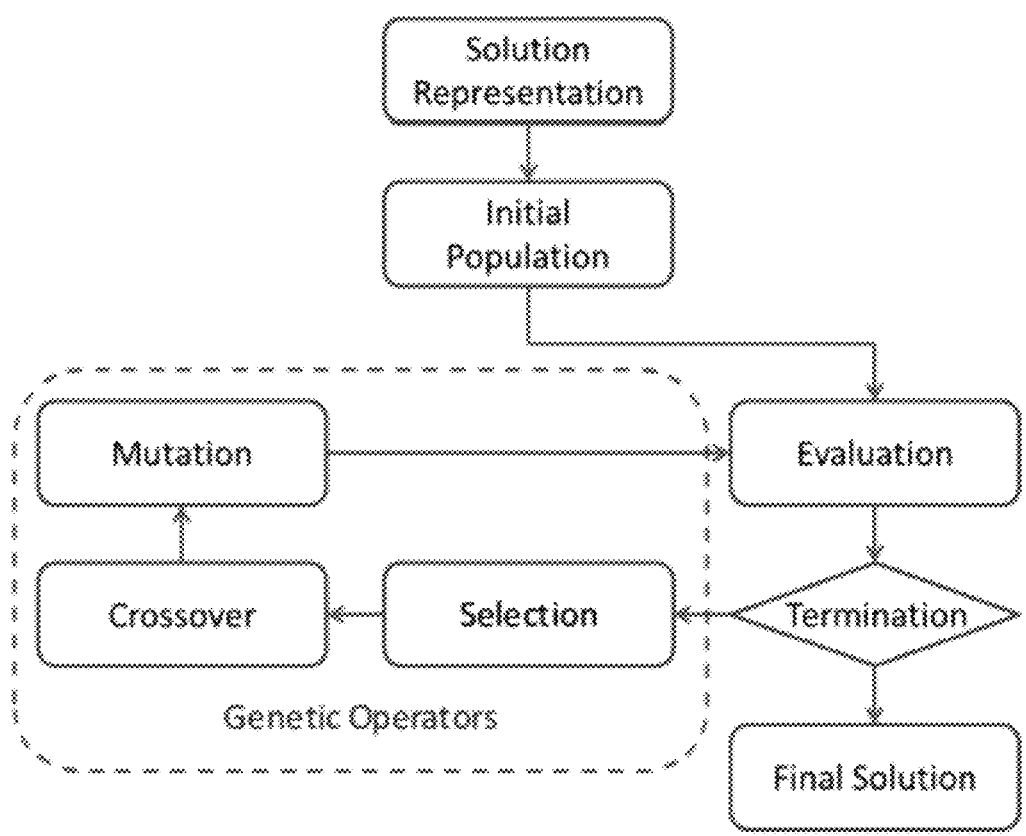
FIG. 9 A flowchart of the operation of GA algorithm.

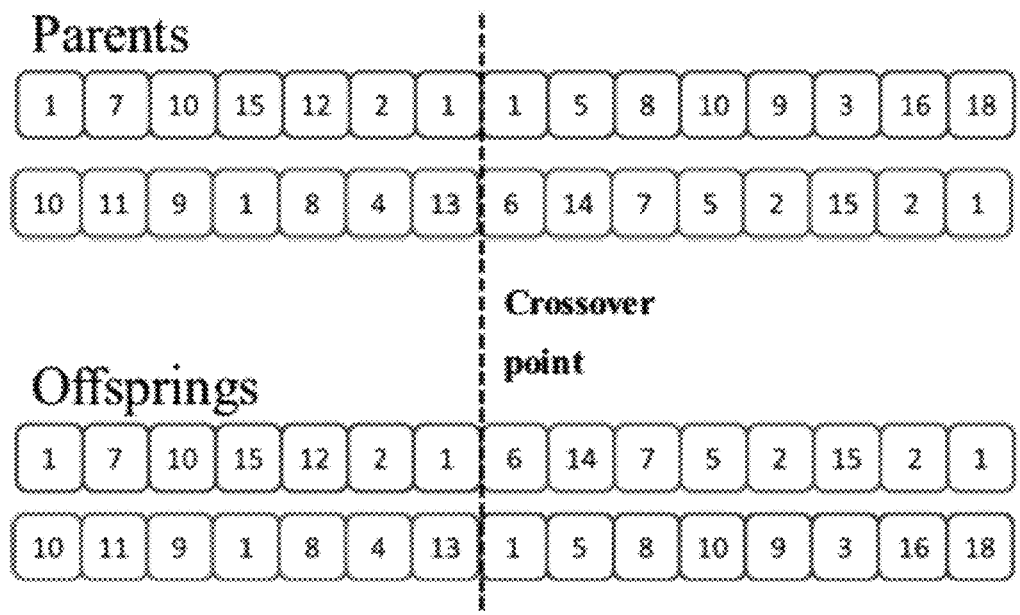
FIG. 10 An illustration of crossover operator in GA algorithm.
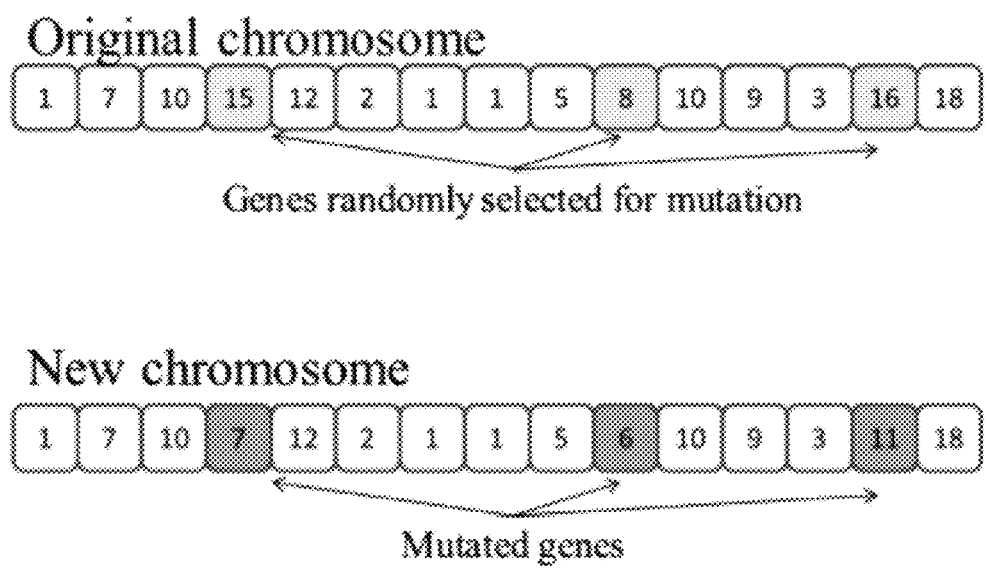
FIG. 11 An illustration of the mutation operator of GA algorithm.

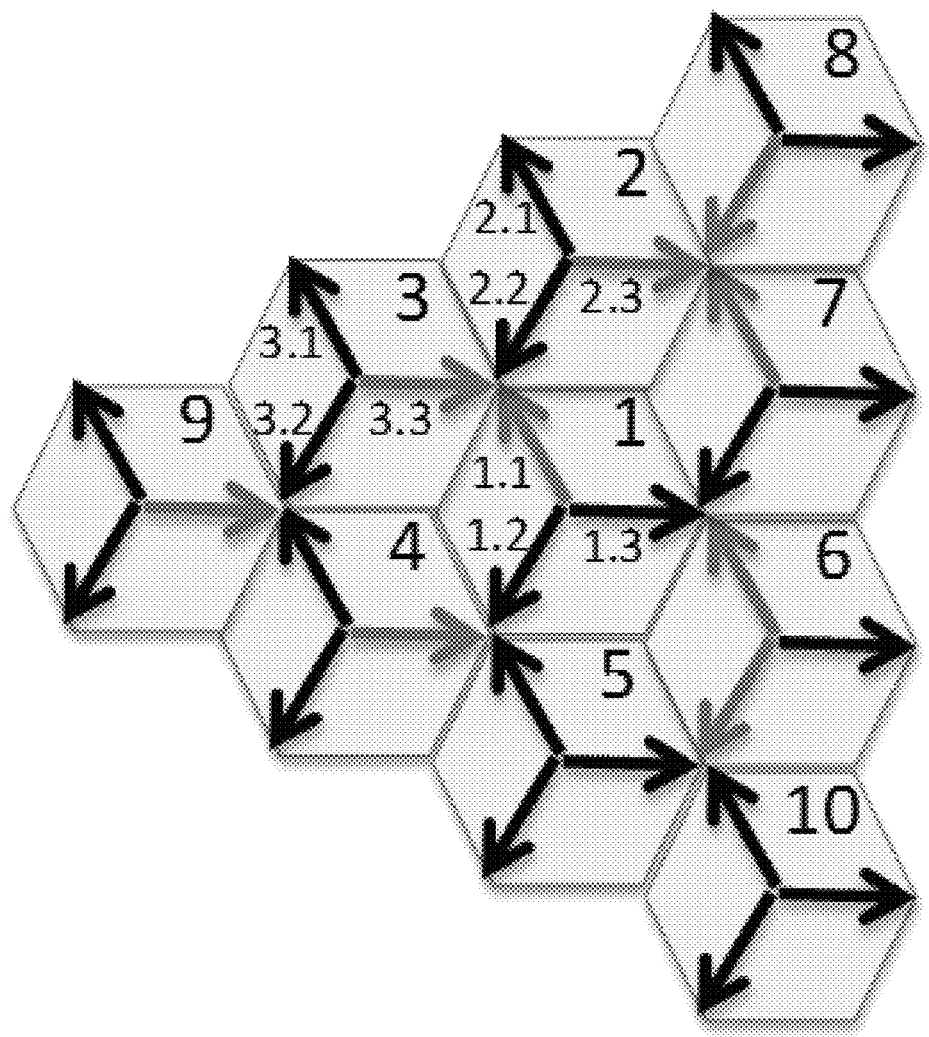
FIG. 12: A typical downtown cellular network cluster comprised of ten sites with each site having three cellular towers.

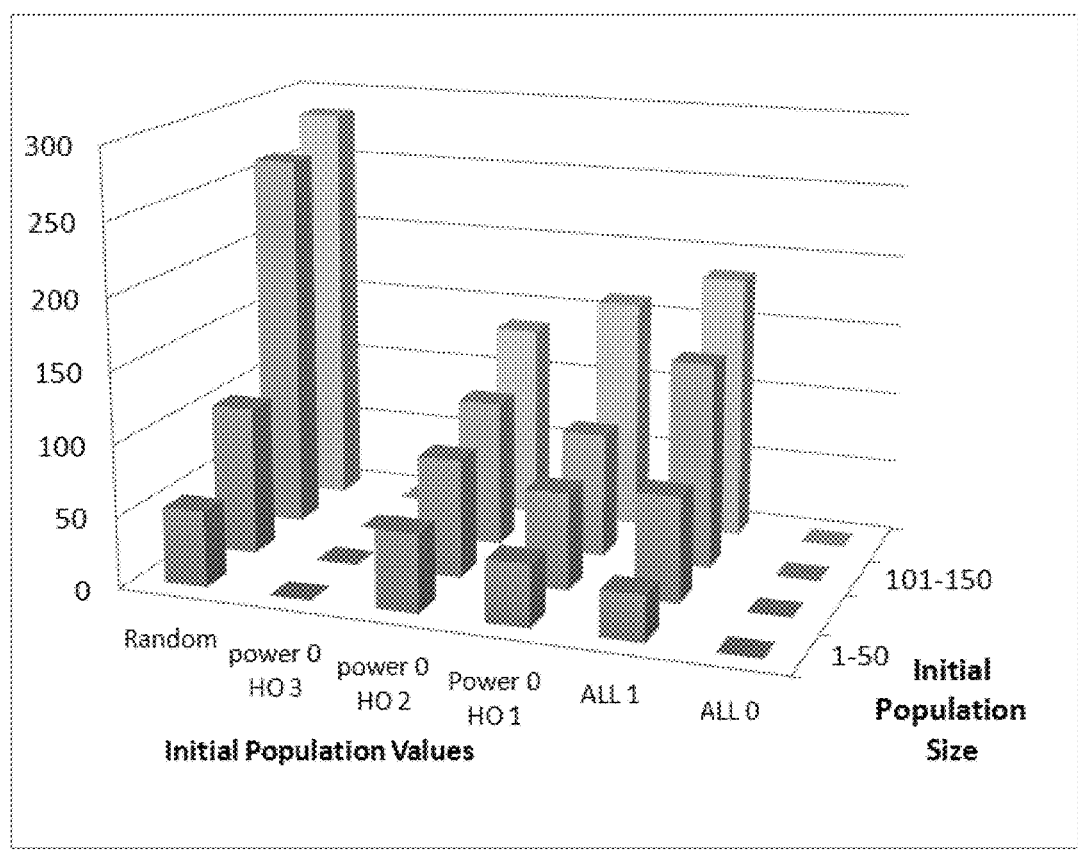
FIG. 13 A comparison of average runtimes for various configurations of GA algorithm.

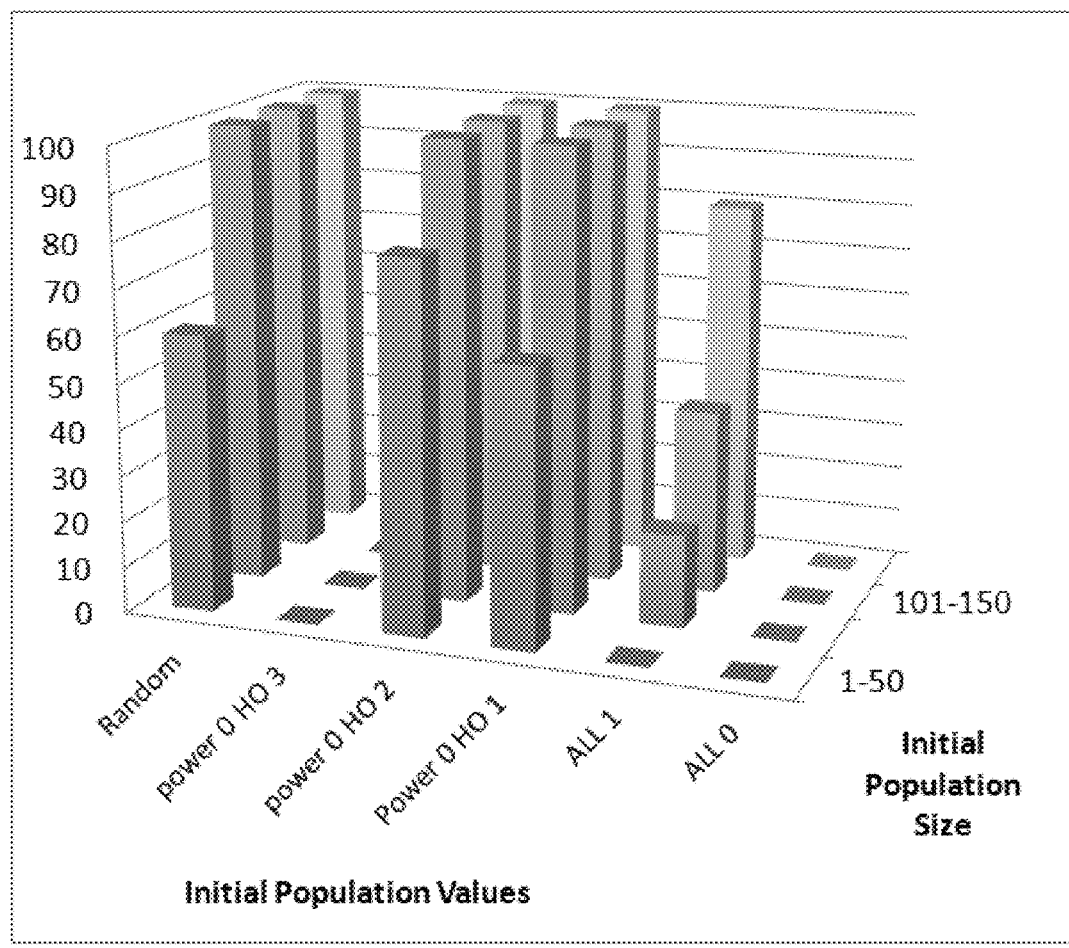
FIG. 14 A comparison of success rates for various configurations of GA algorithm.

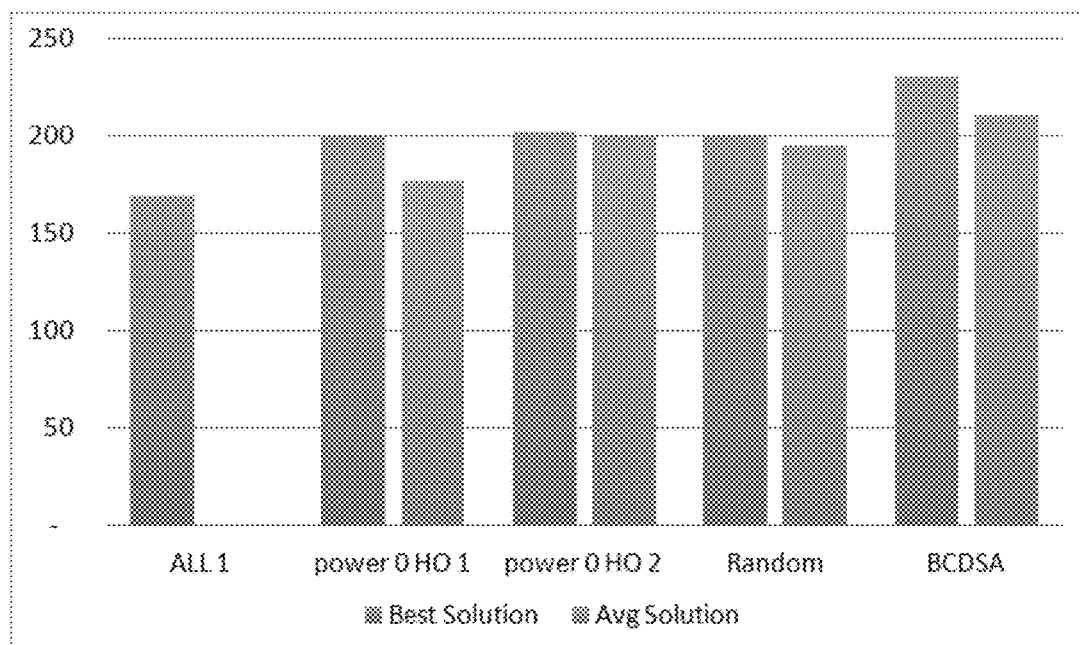
FIG. 15: A comparison of average and best congestion reduction in various scenarios of GA and BCDSA.

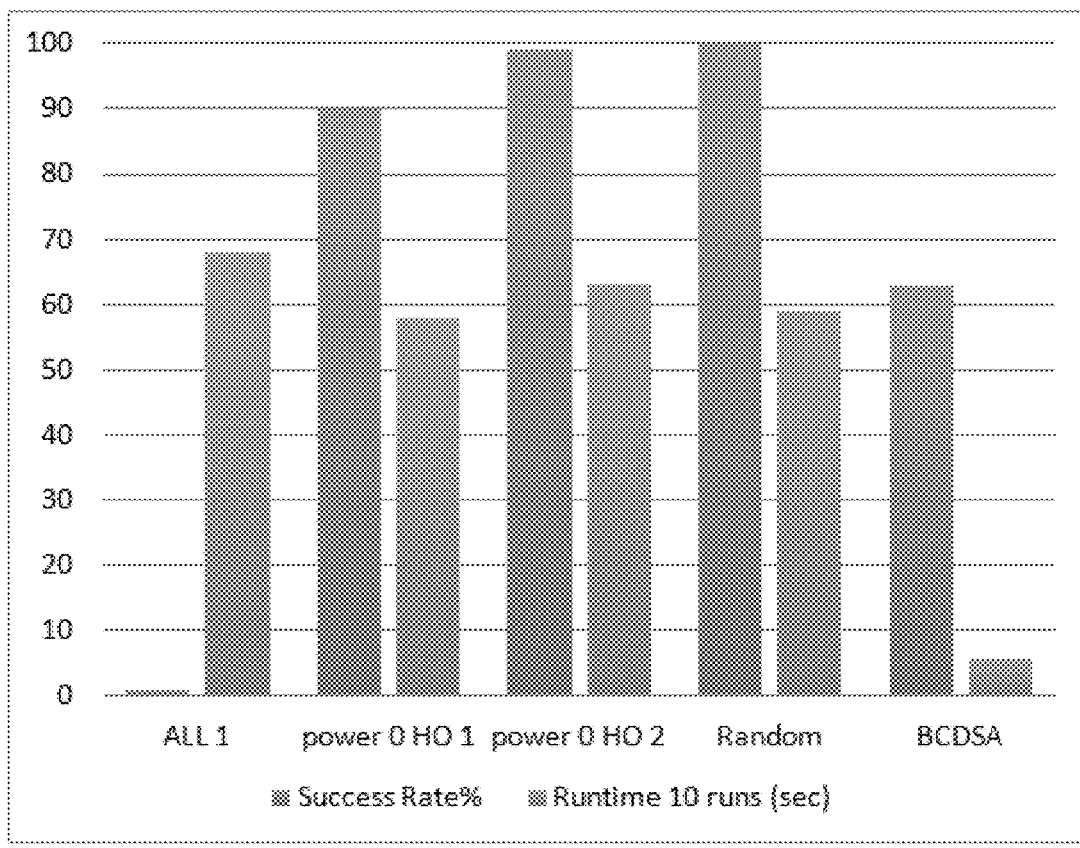
FIG. 16: A comparison of runtimes (in seconds) and success rates (in percents) for various scenarios of GA and BCDSA calculated over 10 runs.

CONGESTION REDUCTION OF LTE NETWORKS

RELATED APPLICATIONS

The present application is related to U.S. Provisional Patent Application Ser. No. 62/348,098, filed on Jun. 9, 2016 which is incorporated herein by reference and to which priority is claimed pursuant to 35 USC 119 and to application Ser. No. 15/488,330, filed on Apr. 14, 2017, which is incorporated herein by reference and to which priority is claimed pursuant to 35 USC 120.

FIELD OF THE INVENTION

The present invention relates to methods, programs, and systems for reducing the overall congestion of a 4G Long Term Evolution (LTE) cellular networks by means of redistributing traffic from congested cellular towers to their non-congested neighboring cellular towers.

BACKGROUND OF THE INVENTION

Due to exponential growth of LTE traffic, mobile operators are spending hundreds of millions of dollars improving their cellular infrastructure. Different capacity improvement and congestion mitigation approaches include spending major capital to acquire new spectrum, building new macro sites to add bandwidth, and building small cells as well as in-building solutions. These approaches have proven effective in certain cases but are expensive and not always practical when facing challenges associated with dynamic capacity demands. When facing dynamic capacity demands and in the absence practically viable systematic optimization approaches, mobile operators exercise manual fine-tuning of cellular network parameters in order to alleviate cellular congestion. However, the results are trivially suboptimal compared to systematic optimization approaches. This invention presents systematic approaches to optimally reduce the congestion of LTE networks.

The capacity challenge in LTE networks is better understood by explaining how resources are allocated to users. Under LTE standard, each cellular tower has a fixed number of Physical Resource Blocks (PRBs) defined in time and frequency. Utilization of each PRB is independent of utilization of other PRBs within the same cell without causing interfere. When a user requests a certain type of service or Enhanced Radio Access Bearer (ERAB), the LTE scheduler at a cell-site will allocate a certain number of PRBs depending on the type of service, i.e., guaranteed bit rate versus non-guaranteed bit rate, required bandwidth, required latency, and most importantly the maximum throughput that can be carried. This throughput associated with each PRB mainly depends on the maximum allowable modulation scheme ranging from QPSK at the lowest level to 16QAM and up to 64QAM. The maximum allowable modulation depends on the Signal to Interference and Noise Ratio (SINR) experienced by a given user for that PRB. For example, a user requesting video streaming while experiencing excellent RF conditions and hence high SINRs will be able to use high modulation schemes such as 64QAM per each PRB assigned and will hence require a small number of PRBs to satisfy its requested ERAB. On the other hand, a user experiencing sub-par RF conditions and hence poor SINRs will only be able to utilize low modulation schemes such as QPSK hence requiring a much larger number of PRBs than the previous user in order to satisfy a similar video streaming quality [8].

FIG. 1 captures the relationship among LTE Channel Quality Indicator (CQI), modulation, coding rate, spectral efficiency, achievable throughput per PRB, and SINR. Aside from the utilization of techniques such as Multi Input Multi Output (MIMO) and Inter-Cell Interference Coordination (ICIC) [8] to mitigate sub-par RF conditions and improve SINR, the physical limitation on the number of available PRB s still presents a challenge required to be addressed in heavily loaded scenarios of operations. Depending on the bandwidth of an LTE channel, each cell offers a fixed number of PRBs. For example, a 5 MHz and a 10 MHz LTE channel offer no more than 25 and 50 PRB s. When the demand for PRB s is higher than what a cell can offer, adverse impacts on User Equipment (UEs) connected to the cell may be imposed. The impacts range from degrading the speed of existing connections, denying incoming handover requests, or even dropping calls in severe cases of congestion. Since LTE systems only support hard handovers and all cellular towers operate on the same frequency, a UE remains connected to its original cellular tower if denied a handover request. Therefore, it can be heavily interfered with by the new cellular tower causing severe quality degradation and eventually a call drop [8].

In order to mitigate the issue noted above, most operators attempt at keeping per cell PRB utilization under a congestion threshold of 80%. The reserved 20% capacity of the cell can then be used to service handover requests and provide a safety margin to avoid denial of handover requests. Cells exceeding the congestion threshold usually trigger augmentation mechanisms such as carrier additions or bandwidth expansions. In an effort to keep PRB utilization under the limit of 80%, it is critical to manage traffic amongst various cells where traffic from highly loaded cells is offloaded to lightly loaded cells serving the same area. This traffic offload can be achieved in several manners, i.e., by changing the footprint of cells, shifting cell boundaries, and changing tilts as well as azimuths of cells. However, implementing physical changes is time consuming and more suited for static or slowly changing environments as oppose to fast changing dynamic environments.

Alternatively, this invention introduces changing the power of a cell i referred to as $\wp_i$ and handover threshold of a cell i referred to as $\hbar_i$ in order to control the serving area of said cell and redistribute traffic as needed. These parameters can be changed instantly in the field in response to dynamic changes in traffic distributions in order to offload traffic from congested cells to neighboring cells. Caution has to be exercised such that traffic offloading is done without congesting the neighboring cells and without degrading the quality of the UEs on the edge of congested cells that end up shifting to a neighboring cell.

The phrases cell, cell tower, and cellular tower are used interchangeably in the disclosure of this invention.

BRIEF SUMMARY OF THE INVENTION

The subject disclosure features a method that effectively predicts the average number of connected UEs associated with PRB utilization congestion threshold of 4G LTE cellular towers and provides a dynamic automated solution that significantly reduces the congestion of LTE networks by redistributing traffic from congested cells to the non-congested cells automatically.

In an embodiment illustrated by FIG. 12, cellular network is a three-tiered network. The cellular network comprises clusters that comprise sites, and the sites comprise cellular towers. The cellular network may comprise one or more clusters of sites. The cluster may comprise a plurality of sites, for instance, ten sites. Each site may comprise a plurality of cellular towers, such as three cellular towers. Each cluster may comprise a plurality of cellular towers, for example, 30 cellular towers.

An embodiment of the present invention comprises a Multi-Layer Perceptron Deep Learning (MLPDL) structure that can be iteratively trained by real network measurement data collected from 4G LTE cellular towers to accurately predict the average number of connected UEs associated with PRB utilization congestion threshold of cellular towers.

In a preferred embodiment illustrated by FIG. 3, MLPDL structure comprises an input layer, a number of hidden layers, and an output layer. The input layer may comprise nineteen processing elements. Said structure may contain two hidden layers with each hidden layer comprising twenty processing elements. The output layer may comprise a single processing element.

In preferred embodiments, MLPDL technique can improve accuracy of predicting the average number of connected UEs associated with PRB utilization congestion threshold. In such embodiments, accuracy of prediction is calculated by root mean square error results where root mean square error decreases as the number of input measurements increases per cellular tower.

A further embodiment of the present invention comprises a detailed formulation of an optimization problem with the objective of minimizing the congestion of a collection of cellular towers beyond their predicted PRB utilization congestion threshold through traffic offloading and subject to constraints associated with preserving the overall cluster load as well as minimum quality thresholds experienced by connected user equipments.

Additional embodiments of the present invention feature solving this optimization problem using two algorithmic alternatives, namely, Block Coordinated Descent Simulated Annealing (BCDSA) and Genetic Algorithm (GA).

In one embodiment, adjusting power or handover threshold of individual cellular towers results in shifting cellular tower borders, redistributing traffic from congested cellular towers to non-congested cellular towers, and reducing congestion.

In one preferred embodiment, BCDSA algorithm described in Algorithm 2 provides an automatic iterative process to reduce congestion and optimally utilize the capacity of a 4G LTE cellular network by applying changes to two sets of decision variables, i.e., power $\wp$ and handover threshold $\hbar$ of cellular towers. In such embodiment, BCDSA algorithm applies changes to one set of decision variables at a time while keeping the other set fixed at that time. Then, it alternates between the set of power and power margin decision variables based on freeze thresholds.

In another preferred embodiment, GA algorithm described in Algorithm 2 provides an automatic iterative process to reduce congestion and optimally utilize the capacity of a 4G LTE cellular network by applying changes to two sets of decision variables, i.e., power $\wp$ and handover threshold $\hbar$ of cellular towers.

In an integrated embodiment illustrated by FIG. 17, the present invention features a method to reduce the congestion of a 4G LTE cellular network. The method may comprise:

importing per cellular tower information (101) including neighbor handover, traffic demand, traffic carried, average transmit power, and minimum acceptable quality;
waiting for the expiration of a refresh timer (102);
importing collected learning measurements since the beginning till the last period (103) upon expiration of said refresh timer;
applying an MLPDL (104) technique to predict breakpoints of the plurality of cellular towers one cellular tower at a time, wherein the breakpoint of a cell tower reflects the average number of users connected to said cell tower associated with the preferred maximum PRB utilization percentage of said cellular tower;
applying the optimization inputs (105), i.e., imported topology information and predicted PRB utilization congestion thresholds;
choosing the optimization algorithm (106);
if BCDSA algorithm is chosen, performing BCDSA algorithm (107) to redistribute traffic as the result of changing power and handover thresholds of the plurality of cells to effectively redistribute traffic from a congested cells to non-congested cells thereby optimally reducing the congestion of the cellular network;
if GA algorithm is chosen, performing GA algorithm (108) to redistribute traffic as the result of changing power and handover thresholds of the plurality of cells to effectively redistribute traffic from a congested cells to non-congested cells thereby optimally reducing the congestion of the cellular network;
collecting the operating parameters of cellular towers from either BCDSA or GA algorithm (109); and
going back to step (102) to wait again for the expiration of said refresh timer.

In another integrated embodiment illustrated by FIG. 17, the present invention features a computer program product stored in a computer readable non-volatile and volatile storage medium. The computer program in capable of reducing congestion of a 4G LTE cellular network. The computer program may comprise:
code for importing per cellular tower information (101) including neighbor handover, traffic demand, traffic carried, average transmit power, and minimum acceptable quality;
code to wait for the expiration of a refresh timer (102);
code for importing collected learning measurements since the beginning till the last period (103) upon expiration of said refresh timer;
code for applying an MLPDL (104) technique to predict breakpoints of the plurality of cellular towers one cellular tower at a time, wherein the breakpoint of a cell tower reflects the average number of users connected to said cell tower associated with the preferred maximum PRB utilization percentage of said cellular tower;
code for applying the optimization inputs (105), i.e., imported topology information and predicted PRB utilization congestion thresholds;
code for choosing the optimization algorithm (106);
if BCDSA algorithm is chosen, code for performing BCDSA algorithm (107) to redistribute traffic as the result of changing power and handover thresholds of the plurality of cells to effectively redistribute traffic from a congested cells to non-congested cells thereby optimally reducing the congestion of the cellular network;
if GA algorithm is chosen, code for performing GA algorithm (108) to redistribute traffic as the result of changing power and handover thresholds of the plurality of cells to effectively redistribute traffic from a congested cells to non-congested cells thereby optimally reducing the congestion of the cellular network;

code for collecting the operating parameters of cellular towers from either BCDSA or GA algorithm (109); and code for going back to step (102) to wait again for the expiration of said refresh timer.

In yet a further integrated embodiment illustrated by FIG. 17, the present invention features a system for reducing congestion of a 4G LTE cellular network. The system may comprise a processor, and a memory coupled to the processor, the memory stores instructions readable by a computing device that, when executed by the processor, cause the processor to perform operations. The operations may comprise:

importing per cellular tower information (101) including neighbor handover, traffic demand, traffic carried, average transmit power, and minimum acceptable quality;

waiting for the expiration of a refresh timer (102);

importing collected learning measurements since the beginning till the last period (103) upon expiration of said refresh timer;

applying an MLPDL (104) technique to predict breakpoints of the plurality of cellular towers one cellular tower at a time, wherein the breakpoint of a cell tower reflects the average number of users connected to said cell tower associated with the preferred maximum PRB utilization percentage of said cellular tower;

applying the optimization inputs (105), i.e., imported topology information and predicted PRB utilization congestion thresholds;

choosing the optimization algorithm (106);

if BCDSA algorithm is chosen, performing BCDSA algorithm (107) to redistribute traffic as the result of changing power and handover thresholds of the plurality of cells to effectively redistribute traffic from a congested cells to non-congested cells thereby optimally reducing the congestion of the cellular network;

if GA algorithm is chosen, performing GA algorithm (108) to redistribute traffic as the result of changing power and handover thresholds of the plurality of cells to effectively redistribute traffic from a congested cells to non-congested cells thereby optimally reducing the congestion of the cellular network;

collecting the operating parameters of cellular towers from either BCDSA or GA algorithm (109); and going back to step (102) to wait again for the expiration of said refresh timer.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE ALGORITHMS

Algorithm 2 contains an algorithmic description of BCDSA algorithm.

Algorithm 2 contains an algorithmic description of GA algorithm.

BRIEF DESCRIPTION OF THE DRAWINGS

FIG. 1 shows a sample illustration of LTE CQI dependency on modulation, coding rate, spectral efficiency, downlink achievable throughput per PRB, and SINR.

FIG. 2 shows sample drawings of LTE PRB utilization as a function of average connected UEs.

FIG. 3 illustrates a sample fixed, fully connected, feed-forward perceptron MLPDL structure utilized for predicting the average number of connected UEs associated with PRB utilization congestion threshold of LTE cellular towers.

FIG. 4 shows minimum RMSE of MLPDL prediction as a function of number of layers and perceptrons.

FIG. 5 illustrates measurements of average runtime of MLPDL as a function of number of layers and perceptrons.

FIG. 6 shows a mapping of QCI classes of service to resource type, priority, delay, and packet error rate in LTE standard.

FIG. 7 shows the impact of changing power of cell A on reducing cell A coverage radius.

FIG. 8 shows the impact of changing handover threshold of cell B on reducing cell A coverage radius.

FIG. 9 shows a flowchart illustrating the operation of GA algorithm.

FIG. 10 illustrates the crossover operator in GA algorithm.

FIG. 11 illustrates the mutation operator in GA algorithm.

FIG. 12 shows a typical downtown LTE cellular network cluster comprised of ten sites with each site having three cellular towers.

FIG. 13 shows a comparison of average runtimes for various configurations of GA algorithm.

FIG. 14 shows a comparison of success rates for various configurations of GA algorithm.

FIG. 15 shows a comparison of average and best congestion reduction in various scenarios of GA and BCDSA algorithms.

FIG. 16 shows a comparison of runtimes (in seconds) and success rates (in percents) for various scenarios of GA and BCDSA calculated over 10 runs.

DETAILED DESCRIPTION OF THE INVENTION

Figure 17:
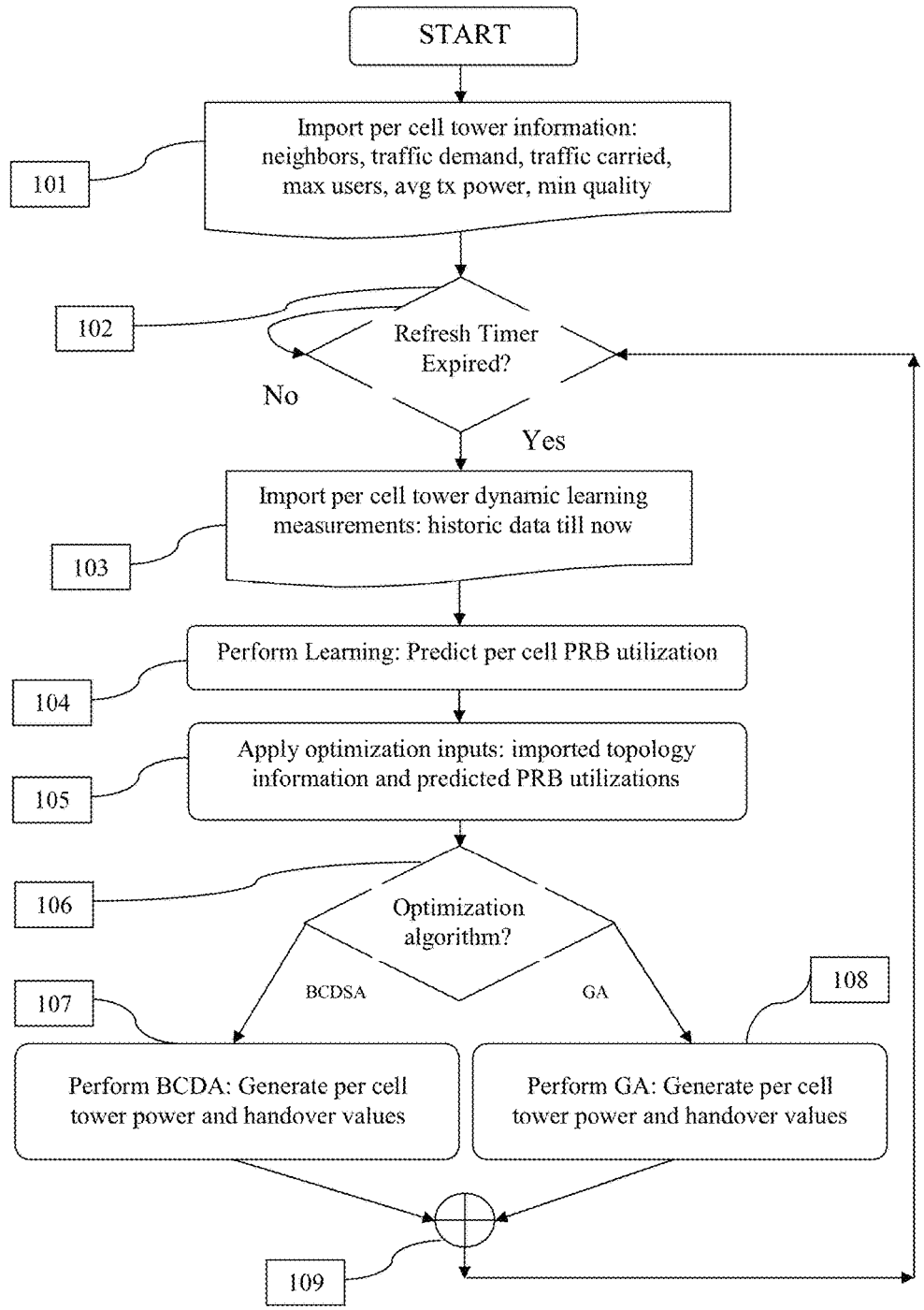
FIG. 17 shows an exemplary flowchart of the present invention.

This invention focuses on systematically finding power and handover settings of a cluster of LTE cells minimizing overall cluster congestion. First, a deep learning scheme predicts the PRB utilization congestion threshold of the plurality of cellular towers belonging to said cluster. Next, an optimization problem aiming at minimizing the congestion of said cluster is formulated using per cellular tower power and handover parameters as decision variables. The problem is then solved using two optimization techniques, namely, GA and BCDSA. Accordingly, an integrated set of method, program, and system aiming at minimizing the congestion of the cluster subject to load preservation and quality constraints are introduced. In an embodiment of the presented modeling and optimization of congestion algorithms, a 4G LTE cellular network cluster illustrated in FIG. 1 is used. This embodiment represents a typical major US city downtown area. The cluster is comprised of ten sites with each site having three cellular towers covering hundred and twenty degrees and presented by arrows pointing at three different directions. For a given operation scenario, cells in red represent congested cells while cells in black represent non-congested cells.

In some embodiments, the present invention presents a solution to congestion minimization by first predicting the PRB utilization congestion threshold of each cell tower as a function of connected User Equipments (UEs) thereby avoiding degradation of neighboring cells offered quality as the result of offloading users from congested cells. Utilizing the predicted PRB utilization congestion thresholds as operational constraints, optimal configurations of parameters $\wp_i$ and $\hbar_i$ with $i \in \{1, \ldots, N\}$ that maximize traffic offloading are identified for the plurality of cells within a cluster set. Said configuration parameters satisfy minimum quality thresholds of the plurality of cells and preserve cluster loading. Low complexity of the solutions allow them to be embedded into live systems making real time decisions about traffic offloading. Hence, offered solutions can operate as intelligent Self Optimizing Network (iS ON) systems. Table 1 provides a listing of notations used in this paper.

Learning-Based Breakpoint Modeling

First, the approach to learning PRB utilization congestion threshold of each LTE cell i in a cluster of cellular towers is discussed. Denoted by $\Lambda_i$, the average number of UEs connected to cell i associated with the congestion threshold of PRB utilization is predicted. FIG. 2 shows sample drawings of actual LTE PRB utilization of different cells as a function of average connected users collected from a major mobile operator data over one month in downtown Los Angeles. Inspecting the graphs, it is evident how each cell has its own characteristic in utilizing

TABLE 1

Table of notations used in this invention disclosure.

| | |
|---|---|
| I | Set of all LTE cells within cluster |
| i | LTE cell index within set I |
| N | The number of cells within set I |
| $\wp_i$ | Power of cell i |
| $\hbar_i$ | Handover margin of cell i |
| $x_i$ | Ordered pair setting ($\wp_i$, $\hbar_i$) for cell i |
| $\underline{x}$ | Vector of elements $x_i$ where $i \in \{1, \ldots, N\}$ |
| $\lambda_i$ | Average connected UEs to cell i |
| $\lambda_i^\wp$ | UE offload of cell i due to power change |
| $\eta_{i,j}$ | Overlap percentage between cell i and its neighbor j |
| $q_i$ | Quality of service experienced by a UE connected to cell i |
| Q | Minimum acceptable quality of a UE |
| $\gamma_i$ | Received SINR of a UE connected to cell i |
| $\delta_i$ | Penalty of violating cell i quality and connected UE constraints |
| $\lambda_{i,j}^\hbar$ | UE offload from cell i to j due to handover threshold change |
| $\Lambda_i$ | Average number of UEs connected to cell i utilizing a PRB congestion threshold of 80% |
| $\Lambda_L$ | Overall cluster load measured as total number of average UEs connected to all cells of set I |
| $\Lambda_\gamma$ | Total congestion of cluster measured as $\Sigma_{i \in I}(\lambda_i - \Lambda_i)$ |
| $\tilde{\Lambda}_\gamma$ | Penalty-augmented $\Lambda_\gamma$ due to violating all per cell quality constraints |
| $\xi$ | Freeze count measure of BCDSA and GA algorithms |
| $\xi_{max}$ | Maximum freeze count measure of BCDSA and GA algorithms |
| m | number of search attempts in BCDSA algorithm |
| T | Temperature of BCDSA algorithm |
| $T_i$ | Initial temperature of BCDSA algorithm |
| $T_f$ | Final temperature of BCDSA algorithm |
| a | Cooling factor of BCDSA algorithm |
| $\rho$ | Multiplier of N controlling the number of iterations at each temperature point of BCDSA algorithm |
| $\sigma$ | Number of times the temperature will be cooled down in BCDSA algorithm |
| B | Boltzman constant |
| n | Initial population count for GA algorithm |
| $\chi$ | Fixed real number multiplier for GA algorithm depending on the number and variation ranges of decision variables |
| $\varepsilon$ | Small number used in the stoppage criterion of GA algorithm |
| R | Random number derived from uniform distribution U [0, 1] |
| $\mathcal{U}$ | Unit step function |

PRB under different loading levels of average connected users. For example, it is observed that cell LBQ06135B21 has a high PRB utilization at a low average connected UEs. On the other hand, cell LBQ04836B11 has a much lower PRB utilization for similar loading values of average connected UEs. Hence, cell LBQ04836B11 reaches 80% congestion threshold of PRB utilization at a much higher number of average connected UEs around 153 users, while cell LBQ06135B21 reaches the same threshold at around 74 UEs. It is evident that cell LBQ04836B11 is able to carry a larger number of UEs than cell LBQ06135B21 before reaching congestion threshold of PRB utilization. The question of interest is then how to predict the value of $\Lambda_i$, i.e., the average number of connected UEs crossing the PRB utilization congestion threshold for each cell i based on its unique characteristics.

Multi-Layer Perceptron Deep Learning

In an embodiment, MLPDL is used to predict congestion threshold of individual LTE cells in a cluster of cell towers. The latter is equivalent to identifying the value of $\Lambda_i$ for each cell i, i.e., the average number of connected UEs crossing the PRB utilization congestion threshold. The major challenge in learning is the identification of proper inputs leading to accurately predicted results. In what follows, associated details are discussed. In an embodiment, the fixed, fully connected, feedforward perceptron learning structure utilized for the task of LTE PRB utilization congestion threshold modeling consists of an input layer with nineteen processing elements to accept nineteen LTE input counters. In order to strike the balance between accuracy and complexity, the structure considers two to four hidden layers, each layer containing ten to twenty processing elements. The structure has an output layer with one processing element predicting the value of $\Lambda_i$ for cell i. FIG. 3 illustrates the MLPDL structure used for the task of learning.

In each iteration of learning, all inputs associated with a sample input are propagated in the forward direction from the input through hidden layers to generate an output. The output value is compared to the measured output and an output error is calculated. The output error is then propagated in the reverse direction to the input layer in order to adjust weighting functions between every pair of processing elements in adjacent layers. The process is repeated until reaching an acceptable threshold of output error. For evaluating the error, Root Mean Square Error (RMSE) is calculated between the measured PRB utilization congestion threshold from the collected data and MLPDL prediction.

FIG. 4 provides illustrations of RMSE variations as a function of the number of processing elements and layers. In each configuration, 20 MLPDL runs are utilized to get average, maximum, and minimum RMSE. Generally speaking, the minimum and average RMSE decrease for higher number of layers and processing elements. Additionally, the runtime of each experiment is a function of the number of layers and perceptrons. While most configurations run in the order of few hundred seconds in conducted experiments, those with more than three hidden layers and more than thirty perceptrons could take additional time to complete depending on utilized computing platform. FIG. 5 reports measurements of average runtimes as a function of the number of layers and perceptrons. Looking at addressing the trade off between runtime and RMSE, an MLPDL structure containing two hidden layers with twenty perceptrons per hidden layer is chosen. Such structure offers an average RMSE of approximately 0.34% and an average runtime of about 352 seconds to complete 10 runs. The latter ensures finding a good solution with a low value of RMSE.

Input Counters to Learning

One of the critical factors in generating accurately predicted results is the choice of input parameters, i.e., LTE counters. The goal is to utilize a group of available LTE counters that are most closely related to PRB utilization of cells. In a number of embodiments, various counters collected from the real network of a major US mobile operator over one week are investigated. Among the set of input data, some of these counter are average and peak connected UEs, PRB utilization, QCI, modulation scheme used, average and peak throughputs of UEs as well as cells, uplink SINR, CQI, spectral efficiency, average Receive reference Signal on Reference Power (RSRP), and Reference Signal Received Quality (RSRQ). In the first embodiment, average active UEs, average connected UEs, and peak connected UEs of a single cell are used to predict PRB utilization congestion threshold of that cell subsequently introducing an RMSE of 34%. Adding call attempts, average and peak number of ERABs, and total VoLTE calls results in an an RMSE of about 36%. In the next embodiment, adding traffic measures of VoLTE in Erlangs and data volume in Megabytes improves RMSE to 22%. It is important to note that this phase adds the actual voice and data loading of connected UEs on individual cells. The following phase adds QCI as presented in FIG. 6 identifying the type of service requested and subsequently reduces RMSE to 20%. In yet the third embodiment, the distribution of modulation schemes is added in an effort to consider the RF conditions and that manages to bring RMSE down to 9%. It has to be noted that better RF conditions allow for using higher modulation schemes thereby allocating a smaller number of PRBs. Modulation types include Quadrature Phase Shift Keying Modulation (QPSK), 16 Quadrature Amplitude Modulation (16QAM), and 64 Quadrature Amplitude Modulation (64QAM). In the last embodiment, average cell throughput, peak cell throughput, average UE throughput, and average cell spectral efficiency are added. The latter results in reducing the RMSE to less than 0.5%. This can be explained realizing the fact that the throughput counters are the best indicators of link qualities and speeds associated with PRB usage.

Congestion Minimization

In additional embodiments, predicted PRB utilization congestion thresholds are utilized in an optimization problem aiming to reduce the overall congestion of a cluster of cellular towers by means of shifting traffic from congested cells to their non-congested neighboring cells. Shifting LTE traffic can be done in two ways. First, adjusting LTE cell power $\wp_i$ of a cell i results in shrinking the footprint of the cell hence shifting UEs on the border to the neighboring cells. Second, artificially changing the handover threshold $\hbar_j$ of a neighboring LTE cell j results in making it look stronger thereby triggering an earlier handover. The latter effectively shrinks the footprint of cell i and shifts border UEs from cell i to cell j. However, traffic offloading has to be controlled to assure the volume of shifted traffic to a neighboring cell keeps the overall load of that neighboring cell below its threshold of congestion.

Hence, the problem aims at identifying the optimal settings of the operating parameters of each cell power $\wp_i$ and handover threshold $\hbar_i$ in order to minimize the congestion of the cluster of cell towers as the result of shifting traffic from congested cells to their non congested neighbors. This is achieved subject to satisfying two constraints associated with the minimum acceptable quality experienced by a UE connected to a cell tower and preservation of the overall load of the cluster of cell towers.

Problem Description

The embodiment of interest attempts at minimizing the cluster congestion by offloading UEs connected to cells experiencing more than 80% PRB utilization to non-congested neighboring cells without congesting them. While any choice of congestion threshold may be considered in different embodiments, a value of 80% utilization is the typical choice of mobile operators preventing various performance issues such as handover failures and call drops.

The approach calls for a) reducing $\wp_i$ power of a congested cell i in order to shrink its footprint and hence shifting traffic to its neighbors, and b) changing the handover threshold $\hbar_j$ of a non-congested neighboring cell j in order to increase the footprint of cell j. Both changes result in shifting existing connected UEs on cell i edges to be served by its neighboring cells at a slightly lower quality than the quality experienced when connected to the original cell i. The quality experienced by a UE connected to cell i is typically represented by SINR denoted as $q_i$.

FIG. 7 illustrates the received signal strength at a mobile user as the user moves from the vicinity of cell tower A to that of cellular tower B. The x-axis is the distance of the user from cell tower A to which the user is initially connected, while the y-axis is the user's received power. In FIG. 7, the blue line labeled A shows that the user's received signal strength from cell A decreases as the distance increases, i.e., as the user travels away from cell A. The green line labeled B shows the user's received signal strength from cell B increases as the distance increases, i.e., as the user travels toward cell B. The intersection point of blue and green lines represents the initial boundary distance point at which the user is handed over from cell A to cell B. The red line labeled A' shows reducing the value of cell power $\wp_A$ by a sample value of 3 dB shrinks the footprint of cell A from $r_A$ to $r_{A'}$. The reduction in cell power shifts the intersection point to the left causing the handover to occur at a shorter distance from cell A where red line and green line cross. This means that the cell radius of cell A and hence footprint has shrunk and UEs have been shifted to cell B. Similarly, FIG. 8 shows the increase in the footprint of cell B from $r_B$ to $r_{B'}$ as the result of increasing the value of handover threshold $\hbar_B$. Increasing $\hbar_B$ by a sample value of 3 dB shifts the original intersection point of the blue line labeled A and the green line labeled B to the left and causes the handover point to occur at a shorter distance from cell A where the blue line labeled A and the red line labeled B' cross. Again, this means that the radius of cell A and hence its footprint have shrunk and UEs have been shifted to cell B.

Problem Formulation

In an embodiment of the invention, the formulated optimization problem is expressed as shown below where $[x]^+ = \max(x,0)$.

$$\min_{\forall \wp_i, \hbar_i} \Lambda_Y = \sum_{i \in I} \left[ \left( \lambda_i + \lambda_i^\wp + \sum_{\substack{j \in I \\ i \neq j}} \lambda_{i,j}^\hbar \right) - \Lambda_i \right]^+ \quad (1)$$

$$\text{S.T.} \sum_{i \in I} \left[ \lambda_i + \lambda_i^\wp + \sum_{\substack{j \in I \\ i \neq j}} \lambda_{i,j}^\hbar \right] = \Lambda_L \quad (2)$$

$$q_i \geq Q, \forall_i \in I \quad (3)$$

The formulation attempts at minimizing $\Lambda_Y$ the total cluster congestion by changing power $\wp_i$ and handover threshold $\hbar_i$ on a cell-by-cell basis. The optimization cost function is subject to two constraints. First, the total number of UEs connected to all cells has to sum up to the total load of the cluster. This constraint in essence guarantees the preservation of load within the cluster. Second, the quality experienced by a UE connected to cell i denoted by $q_i$ has to meet a minimum acceptable quality threshold of Q explained shortly. The total traffic congestion $\Lambda_r$ in Eq. (1) is the difference of the summation of three terms and predicted congestion threshold associated with all individual cells. These terms for cell i are the current UEs connected to cell i, the change in connected UEs associated with changing power $\lambda_i^\wp$, and the sum of changes in connected UEs associated with offloading users from cell i to neighboring cells j after changing handover threshold values of cell j, $\lambda_{i,j}^\hbar$. Finally, $\Lambda_i$ represents the predicted congestion threshold of cell i.

In the embodiment above, the optimization problem represents a nonlinear programming problem with a total of 2N decision variables $\wp_i$ and $\hbar_i$ where $i \in \{1, \ldots, N\}$ and decision variables assume values from discrete sets. Next, a mathematical analysis defining individual terms of the optimization problem is provided.

The change in connected UEs associated with $\lambda_i^\wp$ represents traffic offload to the neighboring cells as the result of shrinking the footprint of cell i after changing $\wp_i$. Accordingly, $\lambda_i^\wp$ is expressed by Eq. (4).

$$\lambda_i^\wp = \lambda_i \left[1 - \left(10^{\frac{-\Delta \wp_i}{K_2}}\right)^2\right] \quad (4)$$

In the equation above, $K_2$ is a constant with typical values of $-40$, $-30$, and $-20$ dB/decade for urban, suburban, and rural environments, respectively. It has to be noted that Eq. (4) is derived utilizing Hata propagation model [8, 9] and assuming the traffic is homogeneously distributed in the serving area as depicted in [10,11].

Similarly, $\lambda_{i,j}^\hbar$ is expressed as a function of the traffic offload of cell i to its neighbor j and the area overlap percentage $\eta_{i,j}$ between cells i and j.

$$\lambda_{i,j}^\hbar = \eta_{i,j} \lambda_i \left[1 - \left(10^{\frac{-\Delta \hbar_j}{K_2}}\right)^2\right] \quad (5)$$

While the overlap percentage can be calculated from handover statistics on a cell pair basis, $\eta_{i,j}$ is set separately for front facing and co-site neighbors. To understand the definitions of front facing and co-site neighbors, note that in FIG. 12 cell 1.1 has front facing neighbors 2.2 and 3.3, and co-site neighbors 1.2 and 1.3.

Next, quality constraints are discussed. The average quality $q_i$ of cell i after applying new settings is presented as shown below.

$$q_i = \min_j q_{i,j} \quad (6)$$

The impact to quality is mainly associated with the shift of cell boundaries due to $\Delta \wp_i$, $\Delta \hbar_j$, or the sum of them combined. The combined effect results in shifting users at the edge of cell i to a neighboring cell j where they are served by a weaker signal and with a degraded quality. This shift is calculated for each serving cell i and each of its neighbors j. The worst quality value $q_{i,j}$ is chosen to present the quality of cell i guaranteed not to be not than a minimum allowed quality level of Q.

In order to express $q_{i,j}$ as a function of $\Delta \wp_i$ and $\Delta \hbar_j$, $\gamma_i$ representing the SINR of a UE connected to cell i is chosen as the quality metric [8, 12]. When reducing the serving cell i power $\wp_i$, the boundary of cell i shrinks forcing the UEs at $r_{A'}$ to be served at a lower quality by a neighboring cell. In environments of interest to this invention, the UEs at the boundary of the serving cell typically experience a reduction of $q_i$ equivalent to the reduction in power $\wp_i$ and handover threshold $\hbar_1$. Hence, the variations in quality of a UE shifted from cell i to a neighboring cell j is expressed as shown below.

$$\Delta \gamma_{i,j} = \Delta \wp_i + \Delta \hbar_j \quad (7)$$

Consequently, the quality impact is captured as shown below.

$$q_{i,j} = \gamma_{i,j} - \Delta \gamma_{i,j} \quad (8)$$

In a typical embodiment of interest to this invention, UEs at a cell boundary experience a reference SINR value of zero dB. Further, a minimum SINR value of $-3$ dB is needed in order to support a minimum modulation scheme of QPSK for covered UEs [8, 13]. Therefore, Q is set to $-3$ dB.

Solution Approach

Considering the fact that the formulated problem is a nonlinear optimization problem in which decision variables assume discrete values, two algorithmic embodiments of namely BCDSA and GA are presented to solve the problem after adding a set of penalty terms $\mathcal{U}_i$ and $\delta_i$ to the objective function [14-16]. Penalty terms are added in order to enforce quality constraints. The penalty-augmented objective function is then defined below.

$$\tilde{\Lambda}_Y = \sum_{i \in I} \left\{ \left[ \left( \lambda_i + \lambda_i^\wp + \sum_{\substack{j \in I \\ i \neq j}} \lambda_{i,j}^\hbar \right) - \Lambda_i \right]^+ + 10^6 * \delta_i + 10^6 * \mathcal{U}_i \right\} \quad (9)$$

In Eq. (9), $$\delta_i \begin{cases} 1, & \left( \sum_{i \in I} \left[ \lambda_i + \lambda_i^\wp + \sum_{\substack{j \in I \\ i \neq j}} \lambda_{i,j}^\hbar \right] \neq \Lambda_L \right) \\ 0, & \text{Otherwise} \end{cases} \quad (10)$$

and $$\mathcal{U}_i = \begin{cases} 1, & \text{if } (q_i < Q) \\ 0, & \text{Otherwise} \end{cases} \quad (11)$$

It has to be noted that $\delta_i$ is a weighted penalty factor applying a constant large hard penalty, set to $10^6$ in one embodiment, for violating the load preservation constraint in equation (2) of cell i. Further, $\mathcal{U}_i$ is a weighted penalty factor applying a constant large hard penalty, set to $10^6$ in one embodiment, for violating the quality constraint in equation (3). Numerically, the load preservation constraint in equation (2) is met by balancing the offloading of connected UEs from a congested cell to its neighbors.

Block Coordinated Descent Simulated Annealing (BCDSA)

Inspired by the block coordinated descent optimization techniques [17-19], the first algorithmic embodiment modifies the standard Simulated Annealing (SA) algorithm in an attempt to address the tradeoff between accuracy and complexity. Referred to as BCDSA algorithm, this algorithmic variation applies the SA algorithm to a partitioned set of decision variables, i.e., optimizing one set while keeping the other set fixed, then optimizing the other set while keeping the first set fixed, and alternating between the two sets. Alternating between two sets of decision variables occurs if the cost function does not change after few iterations of one set measured by a freeze factor $\xi$. There are two per cell decision variables, namely, $\Delta \wp_i$ and $\Delta \hbar_i$. Accordingly, the partitioning strategy splits the decision variables to two sets, namely the set of $\Delta \wp_i$ and the set of $\Delta \hbar_i$ values. The BCDSA algorithm is explained in Algorithm 2.

The worst case time complexity of the BCDSA algorithm is in the order of $O(\sigma \rho N)$ considering its nested while loops. The number of iterations in the outer loop is set to $$\sigma = \frac{\log T_f - \log T_i}{\log a}$$

where $T_i$, $T_f$, and $a$ are the initial temperature, final temperature, and cooling factor of BCDSA algorithm. following the number of temperature points from geometric distribution. The number of iterations in the inner loop is set to $\rho N$ where $\rho$ is a fixed integer multiplier and N is the number of cellular towers.

With respect to convergence, BCDSA algorithm is conjectured to converge to a local optimal point in the vicinity of the global optimal solution of the formulated optimization problem. To support the claim, it is noted that [22] proves the convergence of SA algorithm to a local optimal point in the vicinity of the global optimal point for proper choices of parameters. Further, BCD algorithms are known to converge to stationary points if the Lagrangian function formed by the objective and the nonlinear constraint functions is convex or under milder conditions quasiconvex and hemivariate [23-25]. The BCDSA algorithm is primarily an SA algorithm augmented by BCD techniques and hence the choices of parameters warrant its convergence to a local optimal point. The effect of BCD augmentation is in essence improving its average speed and robustness of convergence. In the absence of a mathematical proof, BCDSA is consistently observed to robustly converge to a vicinity of the global optimal solution, identified by exhaustive search, in higher speeds and high confidence intervals.

The worst case time complexity of the BCDSA algorithm is in the order of $O(\sigma \rho N)$ which is identical to that of standard SA. However, BCDSA has a better average time complexity compared to other SA alternatives. Further, it has much better success rates in converging to the vicinity of global optimal solutions than other SA alternatives.

Genetic Algorithm (GA)

The second algorithmic embodiment of this invention, GA, is driven from the natural evolution of creatures, with the survival of the fittest, and creates child generations that are usually better than parents. This algorithm depends heavily on randomness allowing it to explore vast solution spaces. GA is be able to identify global or near-global optimal points without getting trapped in local optima.

The GA algorithm goes through the following steps [21]:
  Generate an initial population of chromosomes denoted as the first generation.
  Each chromosome is comprised of a number of genes equal to the number of optimization parameters.
  Each gene is assigned a random value in a preset range.
  All chromosomes are evaluated and ranked using a fitness or cost function.
  The next generation of chromosomes is created using genetic operators including Selection, Crossover, and Mutation.
  New generations are evaluated and ranked in turn leading to the creation of yet other new generations.
  This process is repeated until a certain number of generations is created or until there is no improvement in the cost function for newer generations.

This process is summarized in FIG. 9. In an embodiment of applying GA to the optimization problem of this invention, the number of genes is set to 2N presenting the plurality of operating parameters power $\wp_i$ and handover margin $\hbar_i$ of N cells. In an embodiment, the range of these parameters is [0, 3] in order to enforce allowable degradation bounds of quality constraints as captured by Eq. 9. Having experimented with various counts of initial population in different embodiments, it is noted that the larger the initial population size, the better the chance of reaching the global minimum. However, choosing larger population sizes comes at the expense of longer runtimes.

One of the commonly used GA operators is Selection. Applying Selection operator results in choosing a certain percentage of top ranked chromosomes with the highest utility values as parents of the next generation. In an embodiment, a top rank percentage of 2% is used. Another operator, Crossover, is used to combine two chromosomes to create a new chromosome. This is done under the assumption that combining higher fitness chromosomes could result in even better fitting chromosomes thereby improving the overall fitness of a generation. In Crossover, a pair of chromosomes are selected to create offsprings. As illustrated by FIG. 10, offspring chromosomes are in essence a mix of parents in which a portion of genes are chosen from the first chromosome and the remaining from the second chromosome. The new population is ranked again in order to keep its top chromosomes and discard the rest. The last GA operator used is Mutation. As illustrated by FIG. 11, a random chromosome is chosen and the value of a number of its genes are changed. This operator allows the GA algorithm to jump to unexplored areas of the solution space that may have never been explored by other operators or would have taken a much longer time to converge to. Hence, it could help the algorithm escape local optima. Similar to the case of other operators, chromosomes with highest fitness are kept in the population count and the rest are discarded after applying Mutation operator.

Algorithm 2 describes how the GA algorithm is applied to solve the optimization problem of interest to this invention.

The worst case time complexity of the GA algorithm is in the order of $O(n \chi N)$ where n is the GA initial population count, $\chi$ is a fixed real number multiplier depending on the number of decision variables and their ranges, and N is the number of cellular towers.

EXPERIMENTAL RESULTS

Experimental Settings

In evaluating the performance of the algorithms of this invention, a sample embodiment of LTE cellular towers depicted by FIG. 12 is used. Experiments aim at fine-tuning the operating parameters of individual LTE cellular towers in order to reduce congestion.

The embodiment represents a typical cluster of cellular towers used in a dense urban downtown of a US city. The cluster of embodiment has ten sites, with each site having three sectors or cells, each presented with an arrow. In this embodiment, arrows colored in red represent congested cells while those in black represent non-congested cells. As shown by the figure, only a number of but not all cells are congested and further congested cells have at least a neighbor that is not congested. In addition, the cellular network is operating in an urban environment with a propagation loss coefficient of $K_2$ 32–40 dB/decade. Furthermore, a handover margin of 40% is assumed from a cell to its two facing neighbors and 10% to its co-site neighbors.

Additionally, a reduction in $\wp_i$ or increase in $\hbar_j$ results in a similar reduction in SINR for border users based on the selected urban environment and the typical inter site distance. Traffic is homogeneously distributed in the serving area and hence reduction in traffic served is at a rate similar to reduction in serving area. The range of variations of both $\Delta\wp_i$ and $\Delta\hbar_i$ is [0, 3]dB with a granularity of 0.1 dB. Border users are assumed to be served with an SINR value of approximately 0 dB and a minimum acceptable value no smaller than −3 dB [8]. The latter is the minimum value of SINR needed to achieve QPSK coding and throughput as presented in FIG. 1. In the absence of optimization, the baseline value of $\Lambda_r$, i.e., the number of UEs connected to cell towers operating over 80% PRB utilization is 506 under an overall cluster load of 2836 connected users. The purpose of applying optimization is then to reduce the value of $\Lambda_r$ below the baseline while preserving the offered load and offering a minimum experienced quality of −3 dB.

Last but not least, measurements have shown deep learning prediction RMSE errors in the range of [0.5%, 1%] for the congestion threshold of $\Lambda_i$ of cell i associated with 80% PRB utilization. In consideration of the error, a safety margin of 1% is applied to the predicted value of $\Lambda_i$ when running optimization. This ensures that non-congested cells accepting offloaded traffic do not exceed their congestion threshold associated with 80% PRB utilization as a result of error in predicting their breakpoints.

In evaluating performance, each GA experiment is run 10 times for each value of initial population count starting from 10 and ending at 200 chromosomes. Further, BCDSA algorithm is run 100 times. The purpose of running multiple iterations of each algorithm is to measure the best and average congestion reduction values and also to measure the consistency of algorithms in finding good solutions. A solution is considered good if the value of total carried traffic is within 1% of the best solution obtained using that algorithm and others for this problem.

Algorithmic Comparison Results

In comparing the results obtained from both algorithms, different aspects of performance are viewed in terms of i) cost measured as the algorithmic runtime, ii) improvement measured as best and average congestion reduction values, and iii) success rate measured as the percentage of good solutions, i.e., the number of solutions within 1% of the best solution. This last parameter also measures the consistency of an algorithm in finding good solutions.

In an attempt to improve optimization results, reduce convergence time, and improve success rate, GA is run with few initial population values. Scenarios of interest include the followings in which a) all $\wp$ and $\hbar$ are initialized with a value of 0, b) all $\wp$ and $\hbar$ are initialized with values of 1, c) $\wp$ and $\hbar$ are initialized with values of 0 and 1 respectively, d) $\wp$ and $\hbar$ are initialized with values of 0 and 2 respectively, e) $\wp$ and $\hbar$ are initialized with values of 0 and 3 respectively, f) $\wp$ and $\hbar$ are assigned random values.

Comparisons of average runtimes and success rates for various GA configurations is presented in FIG. 13 and FIG. 14, respectively. As seen in these figures, configurations (a) and (e) do not even converge to any good solution. Configurations (b), (c), (d), and (f) are hence chosen with an initial population of 100 chromosomes as they offer the lowest runtimes while achieving high success rates.

FIG. 15 compares average and best congestion reduction in various scenarios of GA and BCDSA from a baseline congestion of 506 connected UEs. It is noted that the remaining congestion is difference between the baseline value of 506 and what is shown in the graph. It is seen that the best and average congestion reduction solutions are very similar comparing most scenarios except scenario (b) in which all parameters are initialized with values of 1. The average case of congestion is not shown in the latter case because the average value increases the baseline congestion of 506 instead of reducing it.

As seen by the results and while accommodating the offered load of 2836 connected UEs, the total volume of congested traffic, i.e., the number of UEs connected to cells with over 80% PRB utilization is reduced from 506 to 302 representing 40.3% overall congestion reduction within the cluster.

In observing the performance of the GA algorithm, significantly higher runtimes are observed compared to BCDSA algorithm. Optimal solutions usually result in $\hbar_j$ variations in the range of 1 to 3 dB and $\wp_i$ variations close to zero. It is also observed that initializing the population with random values of $\wp$ and $\hbar$ usually results in longer convergence times and lower total traffic volumes.

FIG. 16 compares the results of various scenarios of GA with BCDSA in terms of success rate percentage and runtime. It shows that the success rate of most scenarios of GA is nearly 100% guaranteeing to reach a solution that is within 1% of the best solution in 10 attempts. Reviewing the results of BCDSA, a success rate of 63% is observed implying that the algorithm has to be run twice or more times in order to guarantee finding a good solution within 1% of the best solution. All GA algorithms with an initial population of 100 chromosomes record runtimes in the range of 60 to 70 seconds for 10 runs translating to a range of 6 to 7 seconds per run. The latter means that this algorithm can be run near real time in LTE networks Comparing these numbers to the runtimes of BCDA averaging to 5.7 seconds for 10 runs or 0.57 per run, it is concluded that BCDSA is over one order of magnitude faster than GA. The excellent runtime efficiency advantage of BCDA over GA is hence traded off against its lower success rates. In essence, BCDSA can be run many times more than GA within the same time in order to improve its success rate.

The difference in performance can be intuitively explained based on the understanding of how each algorithm works. On one hand, the GA algorithms creates multiple solutions in the population and attempts at optimizing them using crossover and mutations to reach a global optimum. Hence, the chance of getting to that global optimum is higher since it approaches the solution from various directions. This leads to a higher success rate. However, it takes longer to process all these solutions. On the other hand, BCDSA only attempts at navigating its way to the global optimum. Hence, it offers a much lower processing time than that of GA. However, there is a higher chance of getting trapped in a local minimum and missing the global minimum since BCDSA approaches the global minimum from only one direction. A good analogy to this would be hiring 100 amateur hikers to find the mountain summit, versus hiring one professional hiker to navigate around the terrain and find that summit.

Alterations, Modifications, and Clarifications

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

In some embodiments described herein using the phrase "comprising" includes embodiments that could be described as "consisting of", and as such the written description requirement for claiming one or more embodiments of the present invention using the phrase "consisting of" is met.

Reference numbers cited in the claims are exemplary, for ease of review by the patent office only, and are not limiting in any way.

Figures are representatives of concepts only and the claims are not limited by the figures in any ways.

PATENT CITATIONS

[1] U.S. patent application Ser. No. 15/488,330 Learning-Constrained Optimal Enhancement of Cellular Networks Capacity.
[2] U.S. Pat. No. 9,578,607 Radio communication system, radio station, and method for controlling transmission power.
[3] U.S. Pat. No. 9,578,547 System, device, and method of media delivery optimization.
[4] U.S. Pat. No. 9,357,428 Enhanced self-organizing network switching matrix.
[5] U.S. Pat. No. 9,148,744 Network data optimization.
[6] U.S. Pat. No. 7,896,4549 Method and apparatus for managing wireless communication based on network traffic level.
[7] U.S. Pat. No. 8,495,207 Network system for policing resource intensive behaviors.

Non-Patent Citations

[8] M. Ayman, S. El-Nashar, M. A. El-Saidny, *DESIGN, DEPLOYMENT AND PERFORMANCE OF 4G-LTE NETWORKS*. John Wiley & Sons, 2014.
[9] A. H. A. Meciej J Nawrocki, Mischa Dohler, *Understanding UMTS Radio Network Modeling, Planning and Automated Optimisation*. John Wiley & Sons, 2006.
[10] A. F. C. Hurtado. (2005, October) Umts capacity simulation study, master of science in telematics thesis.
[11] I. Siomina and S. Wanstedt, "The impact of qos support on the end user satisfaction in lte networks with mixed traffic," in 2008 *IEEE 19th International Symposium on Personal, Indoor and Mobile Radio Communications*, September 2008, pp. 1-5.
[12] L. Song and J. Shen, *Evolved Cellular Network Planning and Optimization for UMTS and LTE*. Taylor and Francis Group, LLC, 2011.
[13] M. B. Stefania Sesia, Issam Toufik, *LTE-The UMTS Long Term Evolution*. John Wiley & Sons, 2011.
[14] I. Necoara, "A random coordinate descent method for large-scale resource allocation problems," in *Decision and Control (CDC), 2012 IEEE 51st Annual Conference on*, December 2012, pp. 4474-4479.
[15] B. Wah, Y. Chen, and A. Wan, "Constrained global optimization by constraint partitioning and simulated annealing," in *Tools with Artificial Intelligence, 2006. ICTAI '06. 18th IEEE International Conference on*, November 2006, pp. 265-274.
[16] Y. Cui, K. Xu, J. Wu, Z. Yu, and Y. Zhao, "Multi-constrained routing based on simulated annealing," in *Communications, 2003. ICC '03. IEEE International Conference on*, vol. 3, May 2003, pp. 1718-1722 vol. 3.

[17] H. Yousefi'zadeh, A. Habibi, X. Li, H. Jafarkhani, and C. Bauer, "A statistical study of loss-delay tradeoff for red queues," *Communications, IEEE Transactions on*, vol. 60, number 7, pp. 1966-1974, July 2012.

[18] Y. T. Lee and A. Sidford, "Efficient accelerated coordinate descent methods and faster algorithms for solving linear systems," in *Foundations of Computer Science (FOCS), 2013 IEEE 54th Annual Symposium on*, October 2013, pp. 147-156.

[19] R. Qi and S. Zhou, "Simulated annealing partitioning: An algorithm for optimizing grouping in cancer data," in *Data Mining Workshops (ICDMW), 2013 IEEE 13th International Conference on*, December 2013, pp. 281-286.

[20] S. N. Sivanandam and S. N. Deepa, *Introduction to Genetic Algorithms*. Springer, 2008.

[21] A. Chiumento, C. Blanch, C. Desset, S. Polling, L. V. der Perre, and R. Lauwereins, "Multi-objective genetic algorithm downlink resource allocation in lte: Exploiting the cell-edge vs. cell-center trade-off," in *2014 IEEE 21st Symposium on Communications and Vehicular Technology in the Benelux (SCVT)*, November 2014, pp. 116-120.

[22] B. Hajek, "Cooling schedules for optimal annealing," *Operations Research*, May 1988.

[23] J. Ortega and W. Rheinboldt, *Iterative Solutions of Nonlinear Equations in Several Variables*. Academic Press, New York, N.Y., 1970.

[24] P. Tseng, "Convergence of a block coordinate descent method for nondifferentiable minimization," *Journal of Optimization Theory and Applications*, June 2001.

[25] A. Beck and L. Tetruashvili, "On the convergence of block coordinate descent type methods," *SIAM Journal on Optimization*, January 2013.

---

Algorithm 1: ECDSA(Topology,Breakpoints)
Algorithm 1: A description of block coordinated descent simulated annealing algorithm.

Form penalty-augmented objective function $\tilde{\Lambda}_\gamma(\underline{x})$
where $\underline{x} = (x_1, x_2, \ldots, x_N), x_i = (\Delta \mathcal{E}_i, \Delta \hbar_i)$ Set initial values $\underline{x}[0]$ and $T = T_i$
Set $K = \rho N$ and final value $T_f$
Set cooling factor a in interval [0, 1]
Define max freeze factor $\xi_{max}$
$\forall i$, Optimize $\Delta \mathcal{E}_i$ but freeze $\Delta \hbar_i$
While $(T > T_f)$ { /* Temperature Bound */
  Set $k = 0, \xi = 0$
  While $(k \leq K)$ { /* Iteration Bound */
    Choose a random cell i
    if Optimizing $\Delta \mathcal{E}_i$, then $x_i = (\mathcal{E}_i - \Delta \mathcal{E}_i, \hbar_i)$
    elseif Optimizing $\Delta \hbar_i$, then $x_i = (\mathcal{E}_i, \hbar_i + \Delta \hbar_i)$
    end if/else
    $\Delta \tilde{\Lambda}_\gamma = \tilde{\Lambda}_\gamma(\underline{x}[k-1]) - \tilde{\Lambda}_\gamma(\underline{x}[k])$
    if $\Delta \tilde{\Lambda}_\gamma > 0$
      Accept the new solution: $\tilde{\Lambda}_\gamma^* = \tilde{\Lambda}_\gamma, \underline{x}^* = \underline{x}$
    elseif $\Delta \tilde{\Lambda}_\gamma < 0$
      Generate a random number R in interval [0, 1]
      if $\exp[\Delta \tilde{\Lambda}_\gamma / T] > R$,
        then accept the new solution: $\tilde{\Lambda}_\gamma^* = \tilde{\Lambda}_\gamma, \underline{x}^* = \underline{x}$
    end if/else
    if $\tilde{\Lambda}_\gamma[k] = \tilde{\Lambda}_\gamma[k-1]$ /* $\tilde{\Lambda}_\gamma$ is not changing! */
      $\xi = \xi + 1$
    else
      $\xi = 0$
    end if/else
    $k = k + 1$
    if $(\xi > \xi_{max})$ /* Switch decision variables */
      if Optimizing $\Delta \mathcal{E}_i$
        $\forall i$, Optimize $\Delta \hbar_i$ but freeze $\Delta \mathcal{E}_i$
      elseif Optimizing $\Delta \hbar_i$
        $\forall i$, Optimize $\Delta \mathcal{E}_i$ but freeze $\Delta \hbar_i$
      end if/else
      $\xi = 0$
    end
  } /* While (k < K) */
  $T = a*T$
} /* While $(T > T_f)$ */
Report the best solution: $\tilde{\Lambda}_\gamma^* = \tilde{\Lambda}_\gamma, \underline{x}^* = \underline{x}$

---

Algorithm 2: GA (Topology, Breakpoints)

Set real number multiplier $\chi$ and population size $\kappa = \chi * N$
Set chromosomes $\underline{x}_j = (x_1, \ldots, x_N)_j, j \in \{1, \ldots, \kappa\}$ where
  $(x_i)_j = (\Delta \rho_i, \Delta \hbar_i)_j$ and $(\Delta \rho_i)_j$ and $(\Delta \hbar_i)_j$ are individual genes
Set initial population matrix $P[1] = (\underline{x}_1, \ldots, \underline{x}_\kappa)^T$
Form penalty-augmented objective function $\tilde{\Lambda}_\gamma(\underline{x}_j), j \in \{1, \ldots, \kappa\}$
Set $g = 1, \xi = 0$, and $\xi_{max} = 10$
While $(g < \text{MaxGen})$ { /* Generation Number Bound */
  For $(j = 1$ to $\kappa)$ { /* Form elite, crossover, mutation pools */
    Rank chromosomes in population $P[g]$ according to values of $\tilde{\Lambda}_\gamma(\underline{x}_j)$
    Form elite pool (EP) from lowest 2% of ranked values in population $P[g]$
    Randomly assign 80% of the remaining chromosomes in population $P[g]$
      to crossover pool (CP)
    Assign the remaining 18% chromosomes to mutation pool (MP)
  }
  /* Begin creating the new generation $P[g + 1]$ of chromosomes */
  Assign all chromosomes in EP to $P[g + 1]$
  While (CP is no empty) {
    Randomly select chromosomes $C_1$ and $C_2$ from CP
    Cross over genes from chromosomes $C_1$ and $C_2$
    Save resulting chromosomes into $P[g + 1]$
    Remove $C_1$ and $C_2$ from CP
  }
  While (MP is not empty) {
    Randomly select chromosome C from MP and a gene $\psi$ from C
    Randomly change the value of $\psi$
    Save resulting chromosome into $P[g + 1]$
    Remove C from MP
  }
  /* End creating the new generation $P[g + 1]$ of chromosomes */

Algorithm 2: GA (Topology, Breakpoints)

```
    if  (minÃ_y in P[g]) − (minÃ_y in P[g + 1]) / minÃ_y in P[g]  < ε  /* minÃ_y is not changing! */
      ξ = ξ + 1
    else
      ξ = 0
    end if/else
    if (ξ > ξ_max), then break
    g = g + 1
    P[g] = P[g + 1]
} /* While (g < MaxGen) */
Report the best solution: Ã_γ* = Ã_γ(x_j), x* = x_j in P[g]
```

Algorithm 2: A description of genetic algorithm.

The invention claimed is:

1. A method of redistributing traffic from congested cellular towers to non-congested cellular towers in an LTE or an LTE-A cellular network for reducing the congestion of said cellular network wherein said cellular network comprises clusters, clusters comprise sites, and sites comprise cellular towers, and wherein the method comprises:
 a. importing per cellular tower information comprising neighbor handover, traffic demand, traffic carried, average transmit power, and minimum acceptable quality;
 b. waiting for the expiration of a refresh timer;
 c. importing additionally collected periodical measurements of the plurality of cellular towers since the previous expiration of the refresh timer of step b;
 d. applying a learning technique to predict breakpoints of the plurality of both congested and non-congested cellular towers one cellular tower at a time, wherein the breakpoint of a cellular tower reflects the average number of users connected to said cellular tower associated with a preferred maximum utilization of said cellular tower;
 e. applying optimization inputs comprising imported cellular tower information of step a and predicted congestion thresholds of step d;
 f. choosing an optimization algorithm;
 g. applying the optimization algorithm chosen in step f to redistribute traffic as the result of changing operating parameters of the plurality of cellular towers to effectively redistribute traffic from congested cellular towers to non-congested cellular towers thereby optimally reducing the congestion of the cellular network;
 h. collecting operating parameters of cellular towers from the optimization algorithm chosen in step f; and
 i. going back to step b to wait again for the expiration of said refresh timer.

2. The method of claim 1, wherein the learning technique of step d comprises a Multi-Layer Perceptron Deep Learning (MLPDL) technique.

3. The method of claim 2, wherein the MLPDL utilizes a fixed structure fully connected perceptron network for predicting the plurality of the breakpoints of each cellular tower one cellular tower at a time.

4. The method of claim 3, wherein the fixed structure comprises an input layer, one or more hidden layers, and an output layer, and wherein each layer comprises a number of processing elements.

5. The method of claim 4, wherein data flow through each processing element comprises generating the output of processing element after applying a nonlinear function to individually weighted inputs of said processing element.

6. The method of claim 4, wherein inputs of a processing element comprise the outputs of all processing elements in the adjacent layer below the layer in which the processing element is located.

7. The method of claim 4, wherein the set of inputs to the processing elements of the input layer comprise collected measurements of the plurality of cellular towers within the cellular network.

8. The method of claim 2, wherein the MLPDL technique provides an iterative learning process to improve the accuracy of the predicted breakpoint of each cellular tower individually calculated as the error between the actual value of the breakpoint and the output of MLPDL.

9. The method of claim 8, wherein stoppage criterion of the iterative learning process comprises reaching a maximum number of iterations or an error below a small threshold of accuracy.

10. The method of claim 8, wherein each learning iteration is comprised of a forward propagation of the input followed by a backward propagation of the output error.

11. The method of claim 10, wherein during forward propagation of each iteration inputs are propagated from the input layer toward the output layer through hidden layers one layer at a time to set all input and output states of all processing elements.

12. The method of claim 10, wherein during back propagation of each iteration the output error is propagated back toward the input layer through hidden layers one layer at a time to adjust the weighting function between each processing element and individual processing elements in the layer below.

13. The method of claim 1, wherein the optimization algorithm comprises Block Coordinated Descent Simulated Annealing (BCDSA) algorithm.

14. The method of claim 1, wherein the operating parameters of step g comprise control power and handover thresholds.

15. The method of claim 14, wherein reducing the power of a cellular tower results in reducing the coverage boundary of said cellular tower hence shifting users connected to said cellular tower far from its center to neighboring cellular towers thereby reducing the overall congestion of said cellular tower.

16. The method of claim 14, wherein increasing the handover boundary of a cellular tower results in increasing the handover boundary of said cellular tower and shifting users from congested neighboring cellular towers to said cellular tower thereby reducing the congestion of congested neighboring cellular towers.

17. The method of claim 13, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

18. The method of claim 13, wherein the BCDSA algorithm partitions the decision variables to two sets comprising a set of power variables and a set of handover variables and optimizes one set of decision variables in each iteration of the inner iterative process while keeping the other set fixed at that iteration.

19. The method of claim 18, wherein the BCDSA algorithm changes the congestion of a cellular network in each iteration of the inner iterative process, comprising the steps of:
 a. choosing a random cellular tower i;
 b. if optimizing power, subtracting a random value selected from within a range of predefined values from the current power value of cellular tower i;
 c. else if optimizing handover threshold, adding a random value selected from within a range of predefined values to the current handover threshold value of cellular tower i;
 d. calculating the change in the total capacity of said cellular network as the result of applying power or handover threshold change;
 e. accepting the new solution, if the change is negative;
 f. performing the following test, if the change is positive;
  i. generating a random number R in the range [0, 1];
  ii. accepting the new solution, if the exponential value of the ratio of the change and the current temperature is more than R; or
  iii. rejecting the new solution, otherwise.

20. The method of claim 19, wherein the BCDSA algorithm alternates between the set of power and the set of handover threshold decision variables within the inner iterative process based on comparing the previous and current values of the total congestion of the cellular network against freezing thresholds thereby reflecting minor improvements.

21. A computer program product stored in a non-transitory computer readable storage medium to redistribute traffic from congested cellular towers to non-congested cellular towers in an LTE or an LTE-A cellular network for the purpose of reducing the congestion of said cellular network wherein said cellular network comprises clusters, clusters comprise sites, and sites comprise cellular towers, and wherein the computer program comprises:
 a. code for importing per cellular tower information comprising neighbor handover, traffic demand, traffic carried, average transmit power, and minimum acceptable quality;
 b. code to wait for the expiration of a refresh timer;
 c. code for importing additionally collected periodical measurements of the plurality of cellular towers since the previous expiration of the refresh timer of step b;
 d. code for applying a learning technique to predict breakpoints of the plurality of both congested and non-congested cellular towers one cellular tower at a time, wherein the breakpoint of a cellular tower reflects the average number of users connected to said cellular tower associated with a preferred maximum utilization of said cellular tower;
 e. code for applying optimization inputs comprising imported cellular tower information of step a and predicted congestion thresholds of step d;
 f. code for choosing an optimization algorithm;
 g. code for applying the optimization algorithm chosen in step f to redistribute traffic as the result of changing operating parameters of the plurality of cellular towers to effectively redistribute traffic from congested cellular towers to non-congested cellular towers thereby optimally reducing the congestion of the cellular network;
 h. code for collecting operating parameters of cellular towers from the optimization algorithm chosen in step f; and
 i. code for going back to step b to wait again for the expiration of said refresh timer.

22. The method of claim 21, wherein the learning technique of step d comprises an MLPDL technique.

23. The computer program of claim 22, wherein the MLPDL technique utilizes a fixed structure fully connected perceptron network for predicting the plurality of the breakage points of each cellular tower one cellular tower at a time.

24. The computer program of claim 23, wherein the fixed structure comprises an input layer, one or more hidden layers, and an output layer, and wherein each layer comprises a number of processing elements.

25. The computer program of claim 24, wherein data flow through each processing element comprises generating the output of processing element after applying a nonlinear function to individually weighted inputs of said processing element.

26. The computer program of claim 24, wherein inputs of a processing element comprise the outputs of all processing elements in the adjacent layer below the layer in which the processing element is located.

27. The computer program of claim 24, wherein the set of inputs to the processing elements of the input layer comprise collected measurements of the plurality of cellular towers within the cellular network.

28. The computer program of claim 22, wherein the MLPDL technique provides an iterative learning process to improve the accuracy of the predicted breakpoint of each cellular tower individually calculated as the error between the actual value of the breakpoint and the output of MLPDL.

29. The computer program of claim 28, wherein stoppage criterion of the iterative learning process comprises reaching a maximum number of iterations or an error below a small threshold of accuracy.

30. The computer program of claim 28, wherein each learning iteration is comprised of a forward propagation of the input followed by a backward propagation of the output error.

31. The computer program of claim 30, wherein during forward propagation of each iteration inputs are propagated from the input layer toward the output layer through hidden layers one layer at a time to set all input and output states of all processing elements.

32. The computer program of claim 30, wherein during back propagation of each iteration the output error is propagated back toward the input layer through hidden layers one layer at a time to adjust the weighting function between each processing element and individual processing elements in the layer below.

33. The computer program of claim 21, wherein the optimization algorithm of step f comprises BCDSA algorithm.

34. The computer program of claim 21, wherein the operating parameters of step g comprise control power and handover thresholds.

35. The computer program of claim 34, wherein reducing the control power of a cellular tower results in reducing the coverage boundary of said cellular tower hence shifting users connected to said cellular tower far from its center to neighboring cellular towers thereby reducing the overall congestion of said cellular tower.

36. The computer program of claim 34, wherein increasing the handover threshold of a cellular tower results in increasing the handover boundary of said cellular tower and shifting users from congested neighboring cellular towers to said cellular tower thereby reducing the congestion of congested neighboring cellular towers.

37. The computer program of claim 33, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

38. The computer program of claim 33, wherein the BCDSA algorithm partitions the decision variables to two sets comprising a set of power variables and a set of handover threshold variables and optimizes one set of decision variables in each iteration of the inner iterative process while keeping the other set fixed at that iteration.

39. The computer program of claim 38, wherein the BCDSA algorithm changes the congestion of a cellular network in each iteration of the inner iterative process, comprising the steps of:
 a. choosing a random cellular tower i;
 b. if optimizing power, subtracting a random value selected from within a range of predefined values from the current power value of cellular tower i;
 c. else if optimizing handover threshold, adding a random value selected from within a range of predefined values to the current handover threshold value of cellular tower i;
 d. calculating the change in the total congestion of said cellular network as the result of applying power or handover threshold change;
 e. accepting the new solution, if the change is negative;
 f. performing the following test, if the change is positive;
  i. generating a random number R in the range [0,1];
  ii. accepting the new solution, if the exponential value of the ratio of the change and the current temperature is more than R; or
  iii. rejecting the new solution, otherwise.

40. The computer program of claim 39, wherein the BCDSA algorithm alternates between the set of power and the set of handover threshold decision variables within the inner iterative process based on comparing the previous and current values of the total capacity of the cellular network against freezing thresholds thereby reflecting minor improvements.

41. A system comprising processors and memory coupled to processors, the memory storing instructions readable by a computing device that, when executed by processors, cause processors to perform operations to redistribute traffic from congested cellular towers to non-congested cellular towers in an LTE or an LTE-A cellular network for the purpose of reducing the congestion of said cellular network wherein said cellular network comprises clusters, clusters comprise sites, and sites comprise cellular towers, and wherein said operations comprise:
 a. importing per cellular tower information comprising neighbor handover, traffic demand, traffic carried, average transmit power, and minimum acceptable quality;
 b. waiting for the expiration of a refresh timer;
 c. importing additionally collected periodical measurements of the plurality of cellular towers since the previous expiration of the refresh timer of step b;
 d. applying a learning technique to predict breakpoints of the plurality of both congested and non-congested cellular towers one cellular tower at a time, wherein a breakpoint reflects the average number of users connected to said cellular tower associated with a preferred maximum utilization of said cellular tower;
 e. applying optimization inputs comprising imported cellular tower information of step a and predicted congestion thresholds of step d;
 f. choosing an optimization algorithm;
 g. applying the optimization algorithm chosen in step f to redistribute traffic as the result of changing operating parameters of the plurality of cellular towers to effectively redistribute traffic from congested cellular towers to non-congested cellular towers thereby optimally reducing the congestion of the cellular network;
 h. collecting operating parameters of cellular towers from the optimization algorithm chosen in step f; and
 i. going back to step b to wait again for the expiration of said refresh timer.

42. The system of claim 41, wherein the learning technique of step d comprises an MLPDL technique.

43. The system of claim 42, wherein the MLPDL technique utilizes a fixed structure fully connected perceptron network for predicting the plurality of the breakage points of each cellular tower one cellular tower at a time.

44. The system of claim 43, wherein the fixed structure comprises an input layer, one or more hidden layers, and an output layer, and wherein each layer comprises a number of processing elements.

45. The system of claim 44, wherein data flow through each processing element comprises generating the output of processing element after applying a nonlinear function to individually weighted inputs of said processing element.

46. The system of claim 44, wherein inputs of a processing element comprise the outputs of all processing elements in the adjacent layer below the layer in which the processing element is located.

47. The system of claim 44, wherein the set of inputs to the processing elements of the input layer comprise collected measurements of the plurality of cellular towers within the cellular network.

48. The system of claim 42, wherein the MLPDL technique provides an iterative learning process to improve the accuracy of the predicted breakpoint of each cellular tower individually calculated as the error between the actual value of the breakpoint and the output of MLPDL learning.

49. The system of claim 43, wherein stoppage criterion of the iterative learning process comprises reaching a maximum number of iterations or an error below a small threshold of accuracy.

50. The system of claim 43, wherein each learning iteration is comprised of a forward propagation of the input followed by a backward propagation of the output error.

51. The system of claim 50, wherein during forward propagation of each iteration inputs are propagated from the input layer toward the output layer through hidden layers one layer at a time to set all input and output states of all processing elements.

52. The system of claim 50, wherein during back propagation of each iteration the output error is propagated back toward the input layer through hidden layers one layer at a time to adjust the weighting function between each processing element and individual processing elements in the layer below.

53. The system of claim 41, wherein the optimization algorithm of step f comprises BCDSA algorithm.

54. The system of claim 41, wherein the operating parameters of step g comprise control power and handover thresholds.

55. The system of claim 54, wherein reducing the control power of a cellular tower results in reducing the coverage boundary of said cellular tower hence shifting users connected to said cellular tower far from its center to neighboring cellular towers thereby reducing the overall congestion of said cellular tower.

56. The system of claim 54, wherein increasing the handover threshold of a cellular tower results in increasing the handover boundary of said cellular tower and shifting users from congested neighboring cellular towers to said cellular tower thereby reducing the congestion of congested neighboring cellular towers.

57. The system of claim 53, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

58. The system of claim 53, wherein the BCDSA algorithm partitions the decision variables to two sets comprising a set of power variables and a set of handover threshold variables and optimizes one set of decision variables in each iteration of the inner iterative process while keeping the other set fixed at that iteration.

59. The system of claim 58, wherein the BCDSA algorithm changes the congestion of a cellular network in each iteration of the inner iterative process, comprising the steps of:
  a. choosing a random cellular tower i;
  b. if optimizing power, subtracting a random value selected from within a range of predefined values from the current power value of cellular tower i;
  c. else if optimizing handover threshold, adding a random value selected from within a range of predefined values to the current handover threshold value of cellular tower i;
  d. calculating the change in the total congestion of said cellular network as the result of applying power or handover threshold change;
  e. accepting the new solution, if the change is negative;
  f. performing the following test, if the change is positive;
    i. generating a random number R in the range [0,1];
    ii. accepting the new solution, if the exponential value of the ratio of the change and the current temperature is more than R; or
    iii. rejecting the new solution, otherwise.

60. The system of claim 59, wherein the BCDSA algorithm alternates between the set of power and the set of handover threshold decision variables within the inner iterative process based on comparing the previous and current values of the total capacity of the cellular network against freezing thresholds thereby reflecting minor improvements.

* * * * *